United States Patent
Kawabata et al.

(10) Patent No.: US 12,079,267 B2
(45) Date of Patent: Sep. 3, 2024

(54) METHOD AND SYSTEM FOR IMAGE SEARCHING AND EVALUATION USING TAGS

(71) Applicant: CANON U.S.A., INC., Melville, NY (US)

(72) Inventors: Kazunari Kawabata, Port Washington, NY (US); Nikita Spirin, Natick, MA (US); Vladimir Chernykh, Moscow (RU); German Novikov, Moscow (RU); Junko Tajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 510 days.

(21) Appl. No.: 17/429,586

(22) PCT Filed: Feb. 20, 2020

(86) PCT No.: PCT/US2020/018973
§ 371 (c)(1),
(2) Date: Aug. 9, 2021

(87) PCT Pub. No.: WO2020/172366
PCT Pub. Date: Aug. 27, 2020

(65) Prior Publication Data
US 2022/0114207 A1    Apr. 14, 2022

Related U.S. Application Data

(60) Provisional application No. 62/808,671, filed on Feb. 21, 2019, provisional application No. 62/808,706, filed on Feb. 21, 2019.

(51) Int. Cl.
*G06F 16/583* (2019.01)
*G06F 16/535* (2019.01)
(Continued)

(52) U.S. Cl.
CPC ......... *G06F 16/583* (2019.01); *G06F 16/535* (2019.01); *G06F 16/5866* (2019.01);
(Continued)

(58) Field of Classification Search
CPC .......... G06T 7/001; G06T 2207/30121; G06V 10/235; G06V 20/54; G06N 3/082; G06F 18/214
See application file for complete search history.

(56) References Cited

U.S. PATENT DOCUMENTS 7,149,262 B1 * 12/2006 Nayar ................... G06T 3/4015
375/341
8,553,088 B2 * 10/2013 Stein ..................... B60Q 1/1423
382/104
(Continued)

*Primary Examiner* — Yosef Kassa
(74) *Attorney, Agent, or Firm* — Canon U.S.A., Inc., IP Division

(57) ABSTRACT

An image processing method and apparatus is provided for obtaining an image captured by an image capturing apparatus; determining characteristic data of the captured image based on inputting the obtained image into an image analysis model trained with images including a predetermined type of characteristic data; and identifying, based on the determination performed by the image analysis model, metadata including a numeric value regarding the predetermined type of the captured image.

25 Claims, 20 Drawing Sheets

(51) Int. Cl.
  *G06F 16/58* (2019.01)
  *G06N 20/00* (2019.01)
  *G06V 10/25* (2022.01)
  *G06V 10/776* (2022.01)
  *G06V 10/80* (2022.01)

(52) U.S. Cl.
  CPC ............ *G06N 20/00* (2019.01); *G06V 10/25* (2022.01); *G06V 10/776* (2022.01); *G06V 10/809* (2022.01)

(56) References Cited

U.S. PATENT DOCUMENTS

| | | | |
|---|---|---|---|
| 8,559,717 B2 * | 10/2013 | Ranganathan | G06V 20/10 |
| | | | 348/335 |
| 8,611,673 B2 | 12/2013 | Aarabi et al. | |
| 8,630,513 B2 | 1/2014 | Gokturk et al. | |
| 8,655,028 B2 | 2/2014 | Hsi | |
| 8,698,920 B2 | 4/2014 | Uemura et al. | |
| 8,971,612 B2 * | 3/2015 | Shotton | G06T 7/55 |
| | | | 382/159 |
| 9,036,905 B2 * | 5/2015 | Fang | G06F 18/2413 |
| | | | 382/159 |
| 9,092,842 B2 * | 7/2015 | Xu | G06T 7/001 |
| 9,135,277 B2 | 9/2015 | Petrou | |
| 9,275,269 B1 | 3/2016 | Li et al. | |
| 9,405,771 B2 | 8/2016 | Balakrishnan et al. | |
| 9,411,849 B2 | 8/2016 | Liu et al. | |
| 9,514,391 B2 * | 12/2016 | Perronnin | G06V 10/82 |
| 9,798,960 B2 | 10/2017 | Santos et al. | |
| 9,892,133 B1 | 2/2018 | Biessmann et al. | |
| 9,928,407 B2 | 3/2018 | Ganong et al. | |
| 10,157,190 B2 | 12/2018 | Shih et al. | |
| 10,169,686 B2 | 1/2019 | Bourdev et al. | |
| 10,255,507 B2 * | 4/2019 | Taylor | G06T 3/00 |
| 10,540,589 B2 * | 1/2020 | Wang | G06T 7/0002 |
| 10,803,573 B2 * | 10/2020 | Huang | G06T 7/0004 |
| 10,997,463 B2 * | 5/2021 | Wang | G06V 20/62 |
| 2018/0173996 A1 | 6/2018 | Lim | |
| 2018/0181827 A1 | 6/2018 | Kim et al. | |
| 2018/0189615 A1 | 7/2018 | Kang et al. | |
| 2019/0012761 A1 | 1/2019 | Risinger et al. | |
| 2019/0045207 A1 | 2/2019 | Chen et al. | |
| 2019/0180446 A1 | 6/2019 | Medoff et al. | |
| 2019/0188539 A1 | 6/2019 | Lee et al. | |

* cited by examiner

Quality tag N list

| No. | Item |
|-----|------|
| 1 | Sharpness |
| 2 | Focus |
| 3 | Tilt |
| 4 | Noise |
| 5 | Exposure |
| 6 | Dynamic range |
| 7 | Aberration |
| 8 | Diffraction |
| 9 | Distortion |
| 10 | Lens flare |
| 11 | Vignetting |

Fig. 7A

General tag M list

| No. | Item |
|-----|------|
| 1 | Color, dominant color |
| 2 | Composition |
| 3 | Object, Subject |
| 4 | Eyes open/close, Red eye |
| 5 | Emotion |
| 6 | Camera settings (EXIF)<br>-> ISO, shutter speed, F-number, EXIF |

Fig. 7B

| | | | | |
|---|---|---|---|---|
| Metadata | EXIF | Image data | Image ID | - | number | 0202 |
| | | General tag1 | Color, dominant color | Number, word | Date 2011/March/21 |
| | | General tag2 | Composition | Tag item and content | Dominant color: Purple, Pink, Orange |
| | | General tag3 | Object | | Rule of thirds |
| | | General tag4 | Eyes open/close, Red eye | | Object: Bride / Wedding |
| | | General tag5 | Emotion | | 1(Open), 0(Redeye: No) |
| | | General tag6 | Camera settings (EXIF) → ISO, shutter speed, F-number, EXIF | | Happy, Ecstatic, Love |
| | | | | | ISO:100, Shutter speed 1/100s F-number 5.6 |
| | Quality tag1 | Sharpness | Tag item and numerical value | Sharpness: 8.6 |
| | Quality tag2 | Focus | | Focus: 9.4 |
| | Quality tag3 | Tilt | | Tilt: 1.2 |
| | Quality tag4 | Noise | | Noise: 0.43 |
| | Quality tag5 | Exposure | | Exposure: +0.41, - 0.84 |
| | Quality tag6 | Dynamic range level | | Dynamic range: 64dB, level: 8.4 |
| | Quality tag7 | Aberration | | Aberration: 1.9 |
| | Quality tag8 | Diffraction | | Diffraction: 0.46 |
| | Quality tag9 | Distortion level | | Distortion: Barrel, level: 1.4 |
| | Quality tag10 | Lens flare level | | Lens flare: Circle, level:0.01 |
| | Quality tag11 | Vignetting | | Vignetting: 0.78 |

Fig. 8

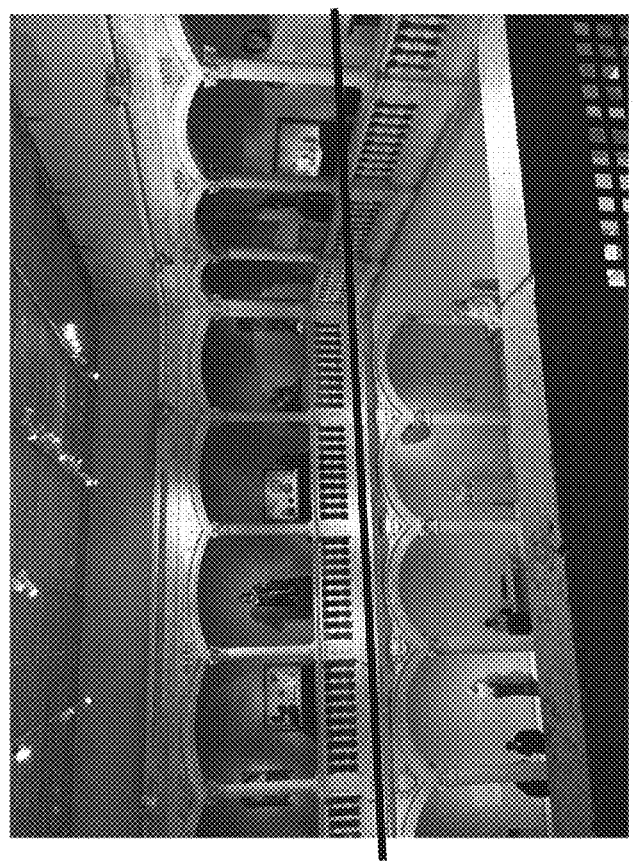
Fig. 12

| | |
|---|---|
| 1 | coast |
| 2 | seaside |
| 3 | sea |
| 4 | strand |
| 5 | littoral |

| | |
|---|---|
| 1 | coast |
| 2 | littoral |
| 3 | seaside |
| 4 | strand |
| 5 | sea |

| | | |
|---|---|---|
| 1 | coast | AI Tag |
| | coast | Human Tag |
| 2 | seaside | AI Tag |
| | littoral | Human Tag |
| 3 | sea | AI Tag |
| | seaside | Human Tag |
| 4 | strand | AI Tag |
| | strand | Human Tag |
| 5 | littoral | AI Tag |
| | sea | Human Tag | tags

· coast ⌁ seaside ▪ sea ╲ stand ▪ littoral

METHOD AND SYSTEM FOR IMAGE SEARCHING AND EVALUATION USING TAGS

CROSS-REFERENCE TO RELATED APPLICATIONS

This application is a National Phase application of International Application No. PCT/US20/18973, filed Feb. 20, 2020 which claims the benefit of U.S. Provisional Patent Application Ser. No. 62/808,671 and U.S. Provisional Patent Application Ser. No. 62/808,706 both filed on Feb. 21, 2019 and both of which are hereby incorporated by reference in their entirety.

BACKGROUND

Field

The present invention relates generally to image processing.

Description of Related Art

There are applications that exist which have object recognition functions that operate on images stored in a storage and enable editing and organizing image data such as photos and videos. These applications can detect objects by recognizing elements in the scene and provide object tags on the image data. To search particular images, users can refer to those object tags by specifying particular words. A drawback associated with these systems occurs when there are many images which have the same object tag (e.g. a cat). Searching by common tags do not give users enough ability to search desired images out of the whole set of image data because the number of images to be searched large. The disclosure below resolves the issues associated with image processing applications as noted above.

SUMMARY

An image processing apparatus and method is provided which receives image data and tags the image data with a first type of tag indicative of elements in the image. The image data is evaluated to obtain other information associated with the image to generate a second type of tag which includes the other information obtained from the evaluation. The image processing apparatus and method further receives image data and analyzes an image. Based on a set of images obtaining one or more of a first type of tags associated with similar images contained in the set. Based on the set of images, one or more of a second type of tags associated with similar images contained in the set is obtained. From the obtained first and second type of tags, it is determined which of the tags are present at predetermined frequency and the received image data is tagged with the determined tags meeting a predetermined threshold.

In one embodiment, an image processing method and apparatus is provided for obtaining an image captured by an image capturing apparatus; determining characteristic data of the captured image based on inputting the obtained image into an image analysis model trained with images including a predetermined type of characteristic data; and identifying, based on the determination performed by the image analysis model, metadata including a numeric value regarding the predetermined type of the captured image.

In another embodiment, an image processing method and apparatus is provided for obtaining an image from an image capturing device; identifying first metadata characterizing content of an previously stored image determined to be similar to the captured image using information describing the previously stored image that was assigned by a user, identifying second metadata characterizing content of the previously stored image determined to be similar to the captured image using information describing the previously stored image that was designated automatically, and controlling a display to display an item which is determined based on the first and second metadata to be representative of content of the captured image.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIG. 1-B is a block diagram of the local side operations of the system.
FIG. 1-C is a block diagram, of the server side operations of the system.
FIG. 7A is a quality tag list.
FIG. 7B is a general tag list.
FIG. 8 is an exemplary data structure.
FIG. 12 is an example images.

Figure 1A:
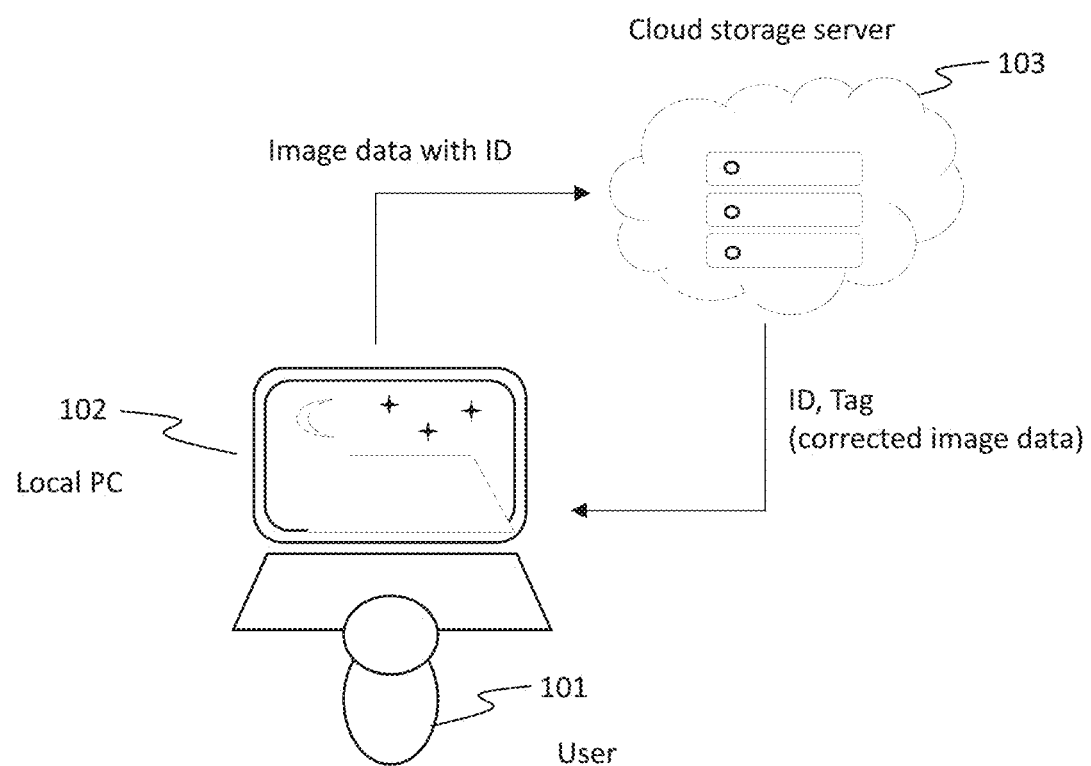
FIG. 1-A is a system diagram.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DESCRIPTION OF THE EMBODIMENTS

In one embodiment, a method and apparatus is provided for searching images using technical evaluation tags.

In one embodiment, a method and system for perform search operations on a set of image data by specifying qualitative tags having technical evaluations associated with individual images of a set of image data advantageously improves the ability to search and locate desired images. Further, image data correction based on the image quality evaluation can be performed.

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figures and embodiments are described below. Needless to mention, embodiments described can be applied/performed in situations other than the situations described below as examples.

FIG. 1A shows a schematic diagram of a system where a user 101 edits, stores and/or organizes image data through an application executing on a local PC 102. The application is communicatively connected to a cloud storage server 103. User 101 can search and/or edit image data displayed on a display associated with the local PC 102 and also can upload new image data through the local PC 102 to the cloud storage server 103. Image data uploaded to the cloud storage server 103 is stored and/or organized by a CPU 119 (see FIG. 1C) in the cloud storage server 103. The CPU 119 is configured to not only to identify objects on the image data, but also evaluate quantitative features related to image quality such as sharpness, focus, tilt, noise, exposure, dynamic range, aberration, diffraction distortion and vignetting.

Figure 1B:
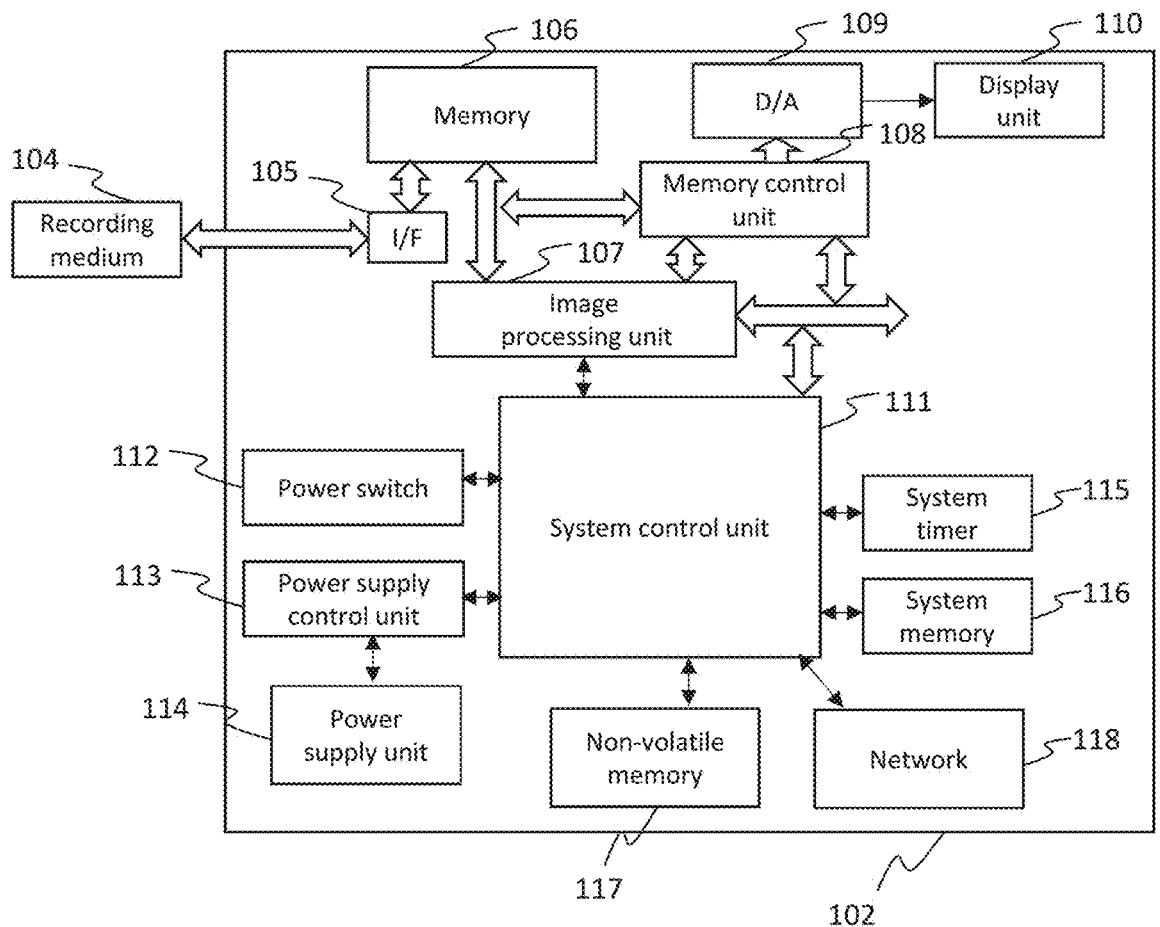
Figure 1C:
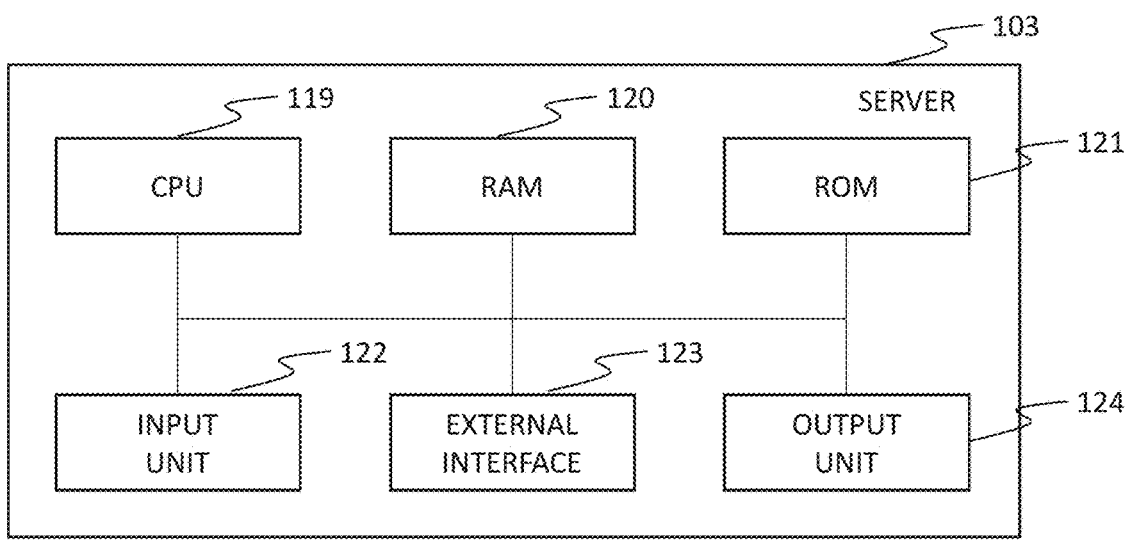

FIG. 1B shows an exemplary configuration the local PC 102 according to the present exemplary embodiment. In FIG. 1B, a recording medium 104 is illustrated. The recording medium 104 may be a memory card for storing captured image data and may be considered storage device. The recording medium 104 may be configured from a semiconductor memory or a magnetic disk, for example. Through the interface 105 and a memory 106, an image processing unit 107 in the local PC 102 can access image data transferred from the recoding medium 104 to process data. The memory 106 operates as a buffer for a data set. In one embodiment, the recording medium is non-transitory. Throughout this disclosure the recording medium 106 may be described as a memory or storage as well.

An image processing unit 107 can perform image searching, resizing processing such as reduction or enlargement, and color conversion processing on data or data supplied from a memory control unit 108. An image processing unit may be a central processing unit or graphical processing unit. In one embodiment, the image processing unit may execute instructions stored in a dedicated memory which specifically configures the image processing unit to perform the described functions and/or operations. In another embodiment, the image processing unit 107 may be embodied as an ASIC.

The image data stored in the memory 106 is converted into digital data by the A/D converter 109, and is displayed on the display unit 110. The memory 106 includes a sufficient storage capacity to store a predetermined number of still images. In another embodiment, the memory 106 may include sufficient storage capacity to store moving images that may or may not include audio for a predetermined time length. The memory 106 also has a function as a source of video memory for image display on the display unit 110.

A non-volatile memory 117 is an electronically erasable/recordable memory. The non-volatile memory 117 may be, for example, an electrically erasable programmable read-only memory (EEPROM). In the nonvolatile memory 117, control programs and instructions that are executed by the system control unit 111 are stored. Such programs are programs, when executed by one or more of the processing units described herein, cause the one or more processing units to perform the operations and/or functions in the various flowcharts described below according to the present exemplary embodiment.

The system control unit 111 executes operations which control the local PC 102. The system control unit 111 realizes some of the below-described processes of the present exemplary embodiment by executing the programs recorded in the non-volatile memory 117. A random-access memory (RAM) is used as a system memory 116 which operate as a work area for the data associated with execution of the control programs by the system control unit 110 during various operations. The system control unit 111 also performs display control by controlling the memory 106, the D/A converter 109, and the display unit 110. The system control unit 111 may include one or more central processing units to perform the described functions.

A system timer 115 is a time measurement unit that measures the time for various controls and the time of a built-in clock.

A power supply control unit 113 is configured from a battery detection circuit, a direct current-direct current (DC-DC) converter, a switching circuit for switching blocks to which power is supplied and the like. The power supply control unit 113 detects whether a battery is mounted or not, a type of the battery, and a remaining battery level. Based on the detection results and an instruction from the system control unit 111, the power supply control unit 113 controls the DC-DC converter and supplies a required voltage to the various parts, including the recording medium 104, for a required period of time.

A power supply unit 114 is configured from, for example, a primary battery, such as an alkali or a lithium battery, a secondary battery, such as a NiCd battery, a NiMH battery, and a Li battery, and an alternating current (AC) adapter. A recording medium interface (I/F) is an interface with the recording medium 104, which is a memory card, a hard disk and the like. The recording medium 104 may be a memory card for recording captured image data. The recording medium 104 is configured from a semiconductor memory or a magnetic disk, for example.

The local PC 102 has a network connection interface 118 and can communicate with other devices such as cloud storage server 103. Communication can occur via local area network and/or wide area network. The communication facilitated by the network connection interface 118 may include wired communication such as by Ethernet cable connection and/or wireless communication including short and long distance wireless communication such as WiFi, Bluetooth, NFC and the like.

Image data uploaded to the cloud storage server 103 is stored and/or organized by a CPU 119 in the cloud storage server 103 in FIG. 1-C. FIG. 1-C shows a configuration example of the local PC 102 according to the present exemplary embodiment. The reference to Local PC 102 should not be construed as limiting and any computing device, including but not limited to a personal computer, laptop computer, smartphone, tablet computer and the like.

The cloud storage server 103 includes a CPU 119, a RAM 120, a ROM 121, an input unit 122, an external interface 123, and an output unit 124.

The CPU 119 of the cloud storage server 103 is configured to not only to identify objects in the image data, but also evaluate quantitative features related to image quality such as sharpness, focus, tilt, noise, exposure, dynamic range, aberration, diffraction distortion and vignetting which will be described later. In addition, the CPU 119 is configured to generate numerical values related to image quality tag items based on the image quality evaluation which may be performed by a trained image recognition engine that was trained beforehand using a plurality of training images.

The CPU 119 is configured to control the entire of the cloud storage server 103 by using a set of stored instructions and/or one or more computer programs in conjunction with data stored in the RAM 120 or ROM 121. Here, the cloud storage server 103 may include one or more dedicated hardware or a graphics processing unit (GPU), which is different from the CPU 119, and the GPU or the dedicated hardware may perform a part of the processes by the CPU 119. As an example of the dedicated hardware, there are an application specific integrated circuit (ASIC), a field-programmable gate array (FPGA), and a digital signal processor (DSP), and the like. The RAM 120 temporarily stores the computer program or data read from the ROM 121, data supplied from outside via the external interface 123, and the like. The ROM 121 stores the computer program and data which do not need to be modified.

The input unit 122 is composed of, for example, a joystick, a jog dial, a touch panel, a keyboard, a mouse, or the like, and receives user's operation, and inputs various instructions to the CPU 119. The external interface 123 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 124 is composed of, for example, a display unit such as a display and a sound output unit such as a speaker, and displays a graphical user interface (GUI) and outputs a guiding sound so that the user can operate the cloud storage server 103.

Figure 2:
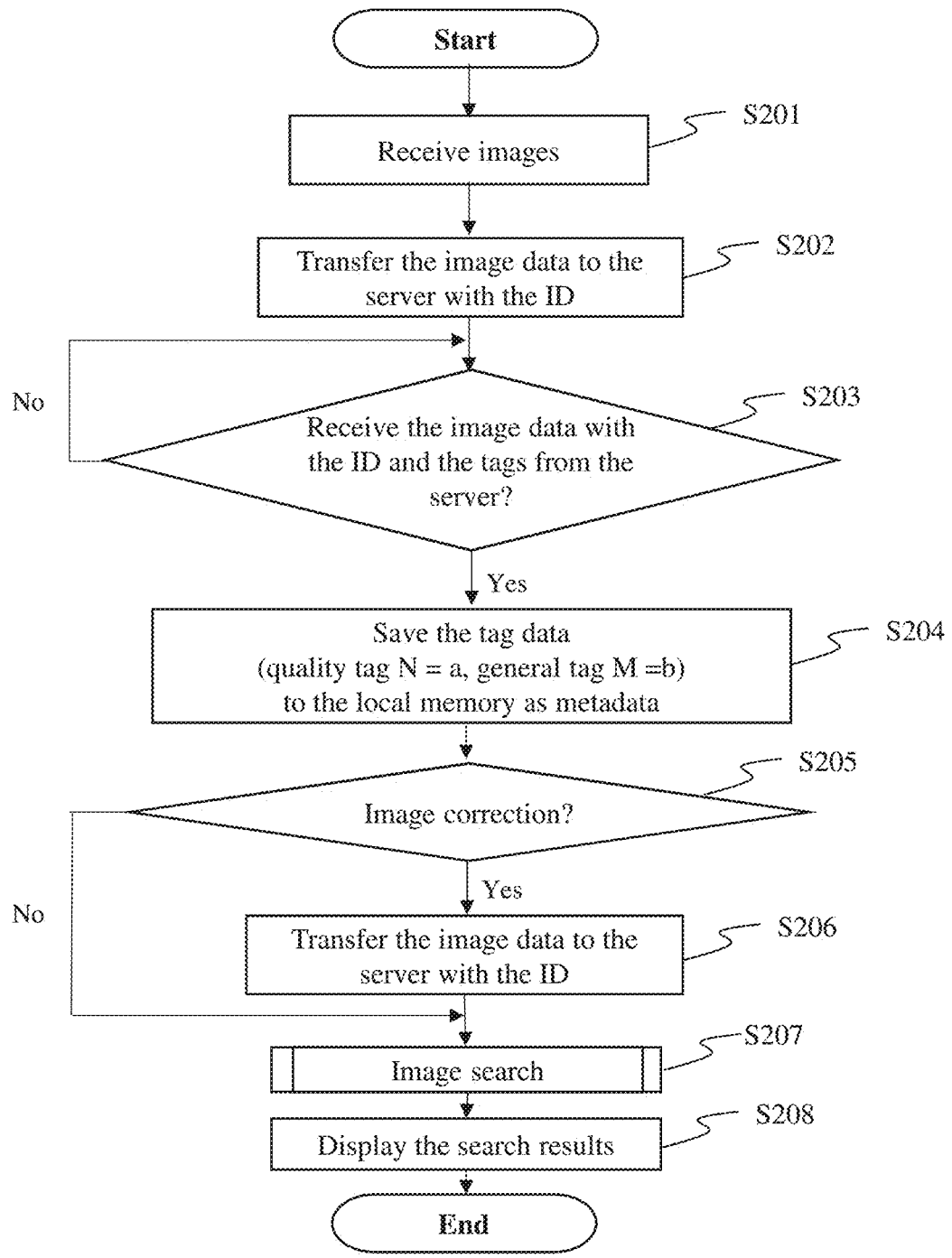
FIG. 2 is a flow diagram of the image data processing.

FIG. 2 illustrates a flow chart of the image processing according to the present exemplary embodiment. The processing is realized by the system control unit 111 executing a program stored in the non-volatile memory 117 and/or in the system memory 116.

In S201, the system control unit 111 performs operations whereby image data is received from an image capturing device and stored in memory 106. The user can selectively define and assign auxiliary information for each image data. The auxiliary information includes one or more tags associated with one or more object/items in each of the received image data as discussed below. The auxiliary information further includes numerical values associated with features in the image as well as content information defining the content in the image data. While the processing described herein refers to image data, it should be understood that this processing can be performed on a plurality of image data (e.g. multiple images) that can be received from the user. Further, while S201 refers to acquiring images from the image capturing device, it should be understood that images can be received from any source of image data including, but not limited to a smartphone, tablet, portable computing device or the like. Thus, reference to PC 102 or local PC 102 is merely exemplary and any type of client computing device that communicates with server 103 is possible.

In S202, the system control unit 111 transfers the image data which was input in S201 to the cloud storage server 103 with the image ID. This image ID is used to link the image data and auxiliary information (e.g. tag items/numerical value/content) which will be generated in S309 and S313 and are described herein below.

After transferring the image data in S202, the operations for generating auxiliary information including tagging items and numerical values for the image will be performed in the cloud storage server 103. Upon completion of these operations, the cloud storage server 103 sends the image data with the image ID, tagged items and numerical value/content to the local PC 102. It should be noted that the auxiliary information sent from the cloud server 103 to the local PC 102 may not always include a numerical value and/or content information with the image data because numerical value will be given only for the image data which was tagged having item classified with a quality tag and content information will be given only for the image data which was tagged having an item classified in the general tag.

In S203, the system control unit 111 determines if the local PC 102 receives the image data with the image ID and auxiliary information (e.g. tagged items and numerical value/content) from the cloud storage server 103. If the system control unit 111 determines that the local PC 102 receives this, the system control unit 111 proceeds the processing to S204. In response to the system control unit 111 determining that this was not received, processing is paused and waits until the determination of S203 indicates that the image data and auxiliary information has been received by the local PC 102. Some of the tagged items are designated in the processing using an image recognition engine 121a stored in ROM 121. The tagged items include at least one quality tag N or one general tag M. The image recognition engine 121a includes an artificial intelligence algorithm which has been trained before the operations of the FIG. 2. In exemplary operation, the system control unit 111 determines if the image data with image ID and auxiliary information (e.g. tagged items and numerical values/contents) are sent from the cloud storage server 103. It should be noted that in the processing of S203, the system control unit 111 may not necessarily receive the actual image data from the cloud server 103. Rather, the system control unit 111 merely needs to receive at least the image ID and auxiliary information (e.g. tagged items and numerical values/content). By referring to the image ID, the system control unit 111 will be able to know the location in storage of the cloud server 103 of the image data associated with the image ID and display the image corresponding to the image ID if needed (or requested).

In S204, the system control unit 111 saves the image data with the image ID, tagged items and numerical values/contents to the memory 106. For example, some of the tagged items are classified as quality tags N, and others are classified as general tags M. For example, in S204, some of the tagged items are camera settings such as Exposure time, F-number, and Image data size etc., and the tagged items are stored as EXIF (Exchangeable image file format). EXIF is for specifying formats and device settings for the image data. Tag items classified as a quality tag category are shown in FIG. 7A and tag items classified as a general tag category are shown in FIG. 7B. The quality tag information is stored as metadata but not as EXIF data. For example, sharpness is a type of quality tag from the quality tag category and is stored as metadata with the image data. This may be stored in the local memory 106 or memory in an external apparatus such as a server. In this example, the quality tag item for sharpness is stored as "Sharpness level: 8.6" shown in FIG. 8. FIG. 8 is a table of data structure and also shows examples of the data which will be stored in the data structure. When tag item=quality tag1, the name of the tag item is sharpness which is stored with tag item and numerical value like Sharpness: 8.6. When tag item=general tag1, the name of the tag item is color dominant color which is stored with tag item. Needless to mention, if a user needs to reduce the entire data size of the data related to the image, the user can store some quality tag N and/or general tag M into the pre-allocated memory area of EXIF as EXIF has some items that may be modified by users, such as "User comment". While "quality tag1" is associated with "sharpness", this is merely exemplary and instead could be associated with Focus, which as shown in FIG. 8, is the tag item for "quality tag 2". Further, while there are eleven quality tags illustrated, this too is exemplary and the present system contemplates any number and types of quality metrics used to note the quality of image data.

In S205, the system control unit 111 determines image correction processing is to be performed. If the system control unit 111 determines that the image is to be corrected, the system control unit 111 proceeds the processing to S206. If not, the processing proceeds to S207.

In S206, the system control unit 111 transfers the image data to the cloud storage server 103 with the image ID. In S206, the image data will be sent with the information indicating that the image is to be corrected. Similar to steps S202, the image correction processing performed after S206 will be performed remotely, for example, in the cloud storage server 103. The processing operations associated with both S202 and S206 will be described hereinafter with respect to FIG. 3. Upon completion of the processing described hereinafter with respect to FIG. 3, the processing of FIG. 2 continues as S207.

In S207, the system control unit 111 executes processing to search for images having at least one common tag items and numerical value/content as the image data which was transmitted to the cloud storage server 103 in S202. A further explanation of the search processing of S207 will be described hereinafter with respect to FIG. 4.

Figure 4:
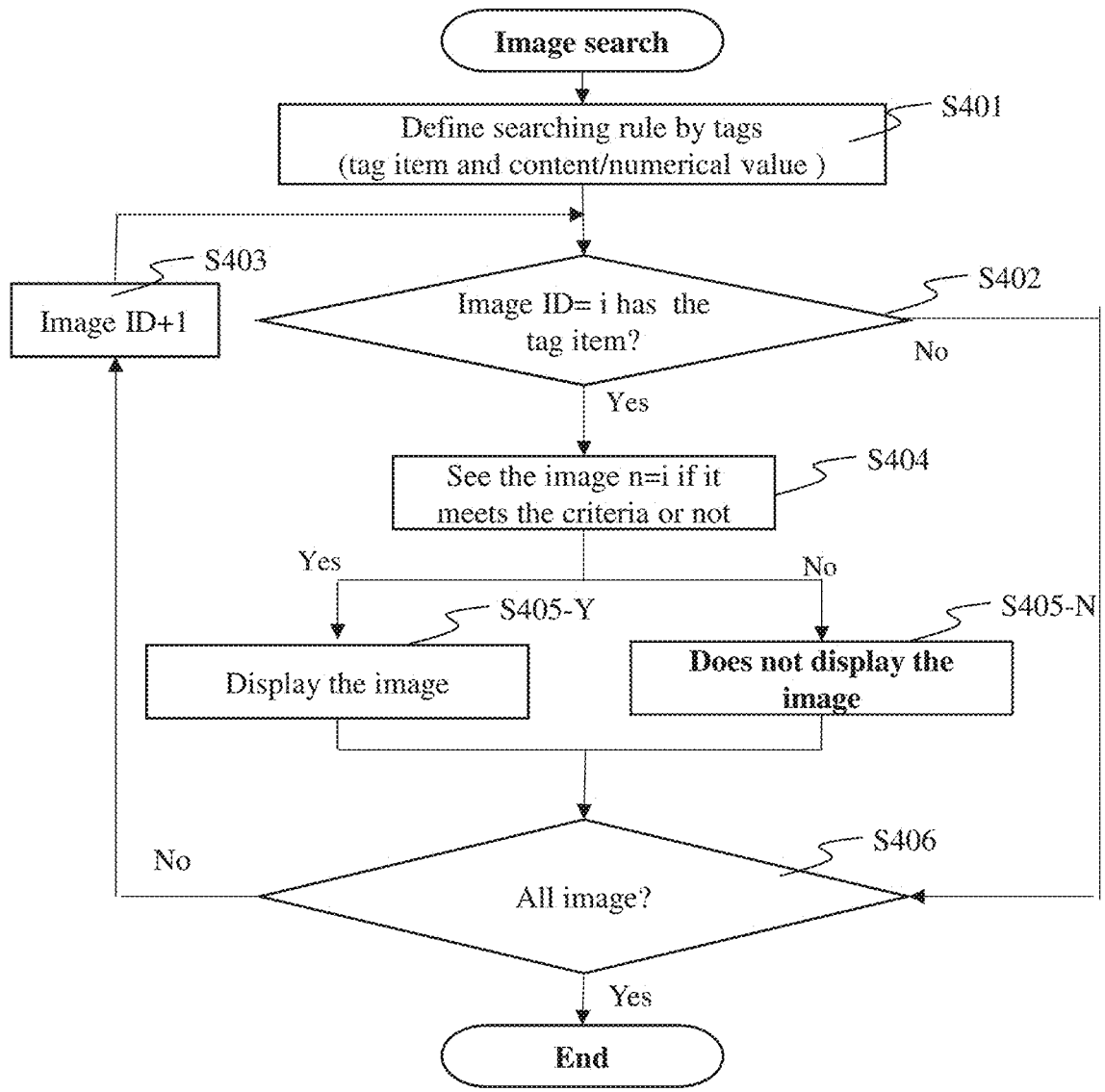
FIG. 4 is a flow diagram of image searching performed in the local environment.

In S208, the system control unit 111 causes images to be displayed on a display device such as display unit 110 based on the search results in S207 (and the associated processing described in FIG. 4). This advantageously enables the user to be able to identify images with particular tag item and numerical value/content easily. According to the processing performed in FIG. 2, the user can find the images with the same tag item and the same numerical value/content as the image which the user selected/put in in S201. The result of this processing allows the user to find similar images as those input by the user without looking many images which may require image editing operations such as, for example, enlarging images, comparing images and/or calculating data associated with the images to determine similarity thereof. Instead, the user by inputs an image into the image processing application described herein and images having similar characteristics (e.g. tag items and numerical values associated with tag items) can be output. For example, when the user wants to find more images that include an object such as a cat and has a predetermined (preferably high) sharpness value which is the image being input by the user into the application, the processing described herein can easily find other images that include an object which is cat and has a degree of sharpness within a predetermined range of the image input for search. In other words, it should be understood that image search described in FIG. 2 can be performed not only for the image which has exactly same numerical value/content. The image search can be performed to find the images with tag item=sharpness, numerical value is more than or equal to the numerical value of the image of S201. This is merely exemplary and other ranges and/or values can be used in the search processing to identify images that are similar to the input image.

In one embodiment, the image search will be performed for the images in the local PC 102 because the image searched needs to have the tag items from the application. However, it should be noted that the image search is not limited to the images in the local PC 102. The image search can be performed for the images in the cloud storage server 103 or images on the internet.

Figure 3A:
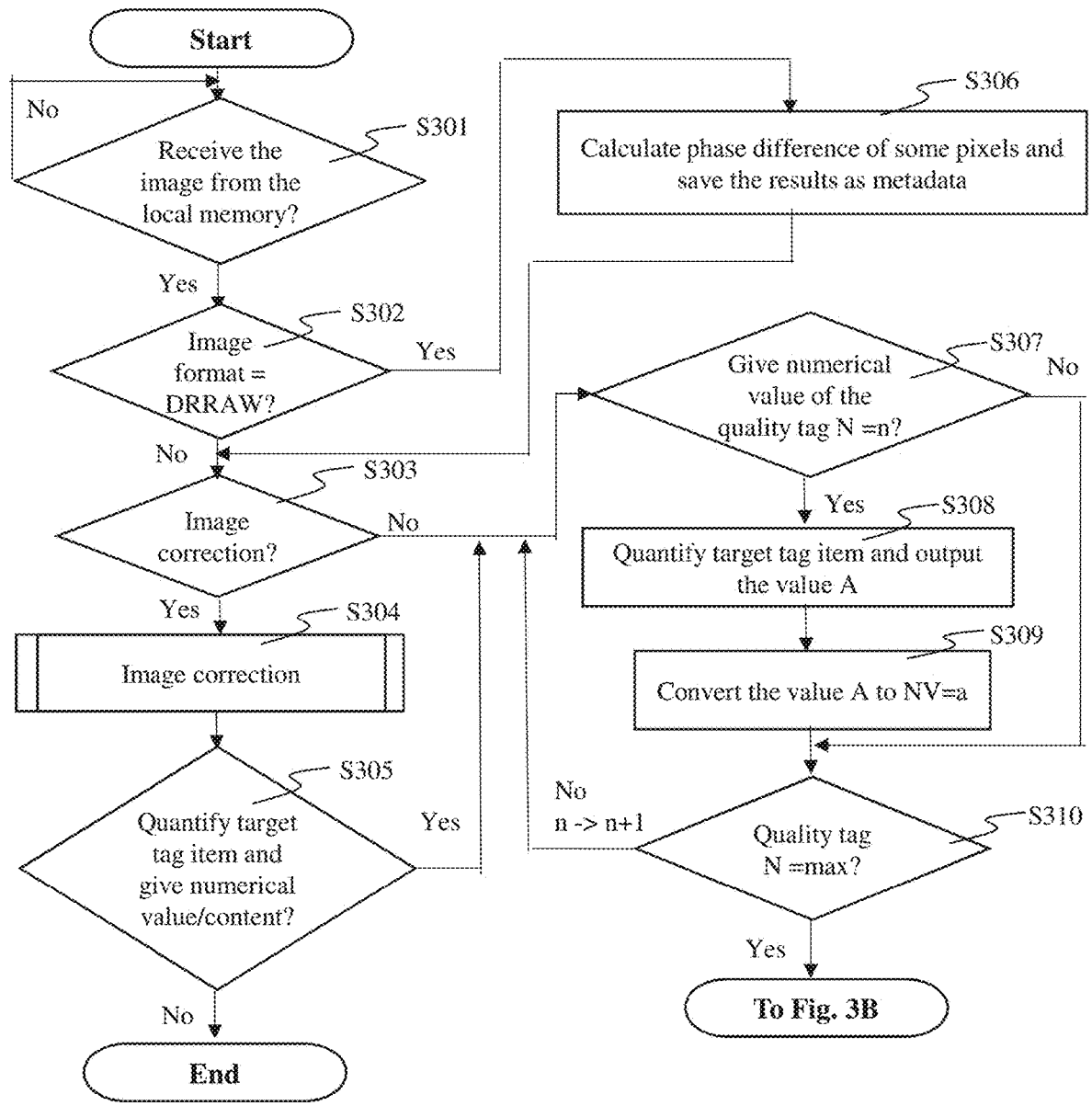
FIG. 3 is a flow diagram of the image data processing on the server
Figure 3B:
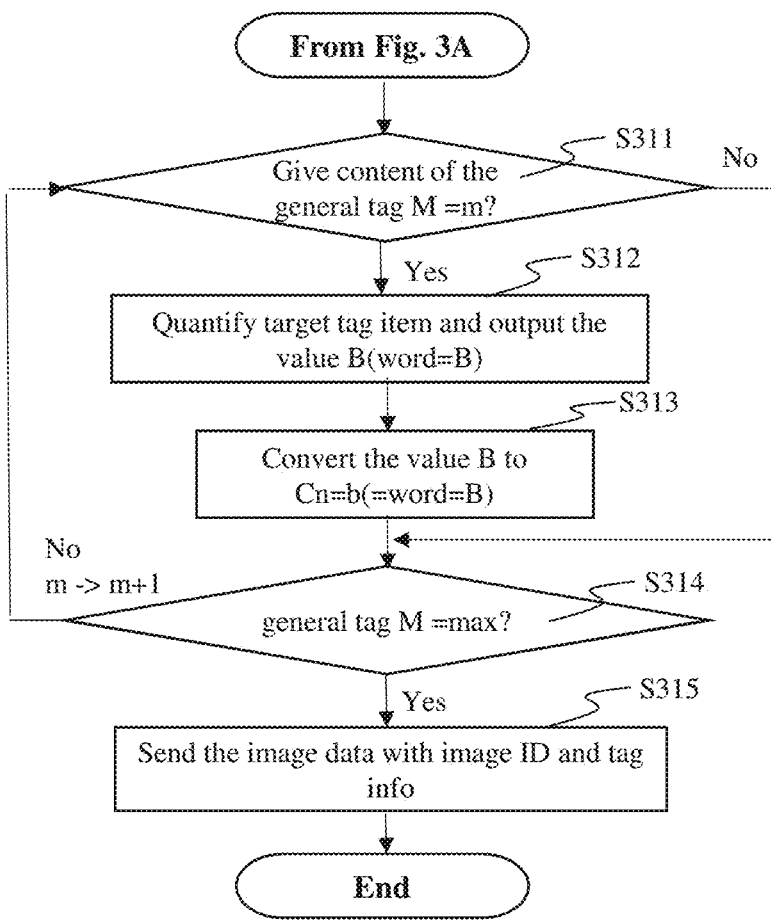

FIG. 3 illustrates a flow chart describing the data processing performed by the cloud storage server 103 according to the present exemplary embodiment. The processing is realized by the CPU 119 which reads a set of instructions (e.g. a program) stored in ROM 121 and executes the instructions. The processing in FIG. 3 starts when the cloud storage server 103 becomes operable.

In step S301, the CPU 119 determines if the image data is received from the local PC 102. If the CPU 119 determines that the image data is received from the local PC 102, the processing proceeds to S302. If the determination as S301 is negative, the CPU 119 will wait until image data is received.

In S302, the CPU 119 determines if the image format of the image data received in the S301 is first image format such as DPRAW (Dual-Pixel Raw) format. If the CPU 119 determines that the image format is in the first image format (e.g. DRRAW format), the processing proceeds to S306. If the determination in S302 yields a result that the image data has a format other than the first image format, processing proceeds to S303.

In the case that the determination of S302 indicates that the image data is in the first image format processing at S306 occurs. In S306, the CPU 119 extracts image data and calculates a phase difference of some pixels which include one or more sub pixels in a single one pixel. The calculated phase difference data will be used as distance information from an object and the image capturing device. Also, the calculated phase difference is used to correct one or more image features including, but not limited to focus point, sharpness level, and/or focus level. After the calculation, the phase difference information is saved as metadata associated with of the image and processing proceeds to S303.

Therefore, in a case that the image in the first format (e.g. DPRAW format), the CPU 119 analyzes the image based on image data such as focus data of each pixel, distance data of each pixel and focus level of each pixel or like that and stores the result of the analysis as metadata. The features analyzed in S306 are usable in the image search processing described herein with respect to FIG. 4. For example, the distance information can be used for image search in FIG. 4 where a designated tag item is "tag item=distance information, content=1.0" which represents the distance between the image and the image capturing device so that the search may return images that have a similar distance value, e.g. "1.0" as the image being input and analyzed by cloud server 103. Thus, the image with the same tag item and the same content can be searched in the processing of FIG. 4.

In S303, the CPU 119 determines if image corrected is to be performed. The user 101 can choose if the image is to be corrected when the numerical value of the tag item is less than a particular number which may be a user set value and/or a predetermined number value. In the case that the determination in S205 of FIG. 2 is YES, the determination in S303 would also be YES. S303 will be performed together with S206. When the determination of S205 is YES and S206 is performed, the image data will be sent to the cloud storage server 103 in S206 and then the processing of FIG. 3 will begin at S303 and the processing proceeds to S304 where one or more image correction processes is performed. If the determination in S303 is negative, the processing of FIG. 3 proceeds from S303 to S307.

In a case, where in S202, the user 101 determines that the image is not of sufficient (e.g. desired) quality required by the user 101 based on one or more the features including, but not limited to, noise, tilt, distortion and the like, a feedback value or a rating may be ascribed to the image data and the determination of S303 will be YES based on the feedback/rating from the user 101. The feedback or the rating can be stored as metadata and sent with the image data with the image ID.

In S304, the CPU 119 performs the image correction processing which will be described in the FIG. 5 and the corrected image is returned and processed further beginning at S305.

In S305, the CPU 119 determines if there are target tag items which were designated by the user 101 to be quantified and to be given new numerical value/content through quantification processing in S308 and/or S312. For example, one of the target tag item is "sharpness" which quantifies the sharpness a part of or whole the image. The user can select if the image will be given numerical value/content after the image correction processing. The user 101 decides to correct the image before S307 or S311 or after S307 or S311. When the user decided to give the numerical value/content before image correction, the user 101 can choose to correct the image without changing the numerical value/content. If the numerical value/content was not changed after the image correction, a mark is generated and associated with the image and shows that the stored image is different or better than the numerical value/contents.

In S305, if it is determined that there are target items, the processing proceeds to S307. If not, the processing proceeds to the end of this flow in FIG. 3.

In the S307, the CPU 119 determines if the numerical value of a quality tag N=n is to be associated with the image. If the CPU 119 determines, in S307, that the numerical value of the quality tag N=n is to be given to the image, the processing proceeds to S308. If the determination in S307 is negative, the processing proceeds to S310. For example, the user can choose quality tag N=1 "Sharpness", and N=2 "Focus" shown in FIG. 7A.

In S308, the CPU 119 performs control to quantify the image according to the target quality tag N=n, and outputs the value A. How to output the value A will be described below for each tag items in quality tag. The value A and numerical value of the tag item are related. The value A shows the result of quantifying of the image in S308 and the numerical value is based on the value A but is changed for easier search. For example, the numerical value can be classified into some levels like from one to ten level or small, middle, large.

For example, in a case that the tag item is "tilt" which is the quality tag 3 in FIG. 7A, the CPU 119 analyzes the image and output how much one or more objects in the image is/are tilted compared to the horizontal line/vertical line. In an example where an image includes a building, if the building in the image is tilted counterclockwise by 1.2 degrees as compared to a horizontal line, the CPU 119 outputs a value A=−1.2. This analysis is performed by using the image recognition engine 121a, and the processing is performed based on an instruction by the CPU 119. The image recognition engine 121a executes functionality that analyzes images in terms of quality, contents and configuration or like that. The image recognition engine 121a is read by the request from the CPU 119 and uses the RAM 120 as workspace memory. The CPU 119 performs the image analysis using the analysis function of the image recognition engine 121a active in RAM 120. The horizontal/vertical line against which the tilt comparison is made is determined based on a trained machine learning model (hereinafter, the AI engine). The AI engine decides which angle or line is standard, and then the CPU 119 controls quantifies the angle of the object compared to the standard line. This may be performed for multiple objects in the same image. This is shown in FIG. 12.

In another embodiment, in a case that the quality tag is "exposure" which is the quality tag 5 in FIG. 7A, the CPU 119 analyzes the image and outputs a probability/possibility value that the image (or objects in the image) are overexposed or underexposed based on histogram data of the image. For example, if the value A is "0.87, 0.04", that means the image has 87% possibility of being overexposed, and 4% possibility of being underexposed. The analysis is also performed by the image recognition engine 121a as discussed above with reference to the tilt quality tag. Thus, the user 101 can understand that there is more possibility that the image is overexposed than underexposed.

In S309, the CPU 119 converts the value A to the numerical value n=a. In other words, the CPU 119 converts the value A into the numerical value. The numerical value, NV n=a is based on the value A. The conversion of value A to the NV n=a is the tagging operation performed by the image processing system described herein and how to convert the value A to the NV n=a is based on type of the quality tag n.

When the quality tag is tilt and the value A is "−1.2" which is described in the S308, the NV 3=−1.2, or it can be described that NV n=2. How to convert −1.2 to 2 is described below. The value A does not need to be used itself for tagging. For example, in the case that |0.8|<the value A<|1.5|, the quality tag 3 can be =1. In other case that 0 the value A≤|0.8|, the quality tag 3 can be =0. Like in this case, the value A can be converted on a scale of any numbers.

And in a case where the tag is "exposure", the CPU 119 converts the value "0.87, 0.04" to the quality tag "tag overexposed=0.87, tag underexposed=0.04". Or the CPU 119 converts the value A to the single positive number.

For example, in a case that the NV 5="0.10, 0.10", the image is not likely both overexposed and underexposed. In another case that the NV 5="0.80, 0.10", the image is most likely overexposed whereas in a case that the NV 5="0.10, 0.90", the image is most likely underexposed. For instance, in a case that the values are both smaller than 0.1, the quality tag5 can have a value=5. In another case that the values are both smaller than 0.3 and greater than 0.1 and the first value is greater than the second value, the quality the NV 5 can be =5. In another case where values are both greater than 0.3 and smaller than 0.5 and the first value is greater than the second value, the quality tag 5 can be =7. In another case that the values are both smaller than 0.7 and greater than 0.5 and the first value is greater than the second value, the quality the NV 5 can be =8. Like these ways shown here, quantified the value A can be shown as a tag defined on a scale of 1 to 10 or a scale of 1 to 8.

In S310, the CPU 119 determines if the number of the corresponding quality tag N is greater than or equal to a maximum number. In other words, the CPU 119 determines if the CPU 119 has given numerical values which the user 101 chose to give to the image (tag item which the user chose). If it is determined that that values of the image data reach those that were provided by the user, the processing proceeds to S311. If not, the processing proceeds back to S307, and repeat the operations regarding quality tag N=n+1. By repeating from S307 to S310, all the quality tag N which the user 101 selected will be designated the numerical value to the image. By tagging the multiple tag items, the user 101 will be able to search the images which the user wants to find. And the user will be able to compare the images in multiple points of view by checking multiple tag results.

In S311, the CPU 119 determines if a general tag M=m is to be given to the image. If the CPU 119 determines that the general tag M=m is to be given to the image, the processing proceeds to S312. If not, the processing proceeds to S314. Examples of types of general tags is shown in FIG. 7B. For example, the user can choose general tag M=1 "Color, dominant color", and M=2 "Composition" shown in FIG. 7B.

In S312, the CPU 119 quantifies the image regarding the target general tag M=m, and outputs the value B. If the tag item is not quantified but can be presented by word, the results of S312 will be not value B but words. For example, in a case the general tag is "object", the CPU 119 analyzes the image, from the pixel data in the image, determines what, if any, objects are in the image and outputs a list of objects are in the image. For example, the CPU 119 outputs a text value which describes or characterizes the object and a numerical value that ascribes a probability that the text value for the image is true. For example, the output from the analysis can be the following:

"cat: 0.87, ball: 0.81, tree: 0.64, dog: 0.41, bed: 0.18"

An output such as this indicates that the image includes a cat with a probability that the particular object is cat being 87%, a ball with the probability that the particular object is a ball being 81%, a tree with the probability that the particular object is a tree being 64%, a dog with the probability that the particular object is a dog being 41%, and a bed with the probability that the particular object is a bed being 18%. This assessment is done by the image recognition engine 121a.

As an another example, in a case the general tag is "emotion", the CPU 119 analyzes the image and determines an emotion embodied by the image (or by one or more objects within the image). In this case, the CPU 119 outputs a text value which describes or characterizes the object and a numerical value that ascribes a probability that the text value for the image is true such as "happy: 0.86, sadness: 0.12, surprise: 0.43"

An output such as this indicates that emotion embodied by the image happiness with a 86% probability, sadness with 12% probability, and surprise with 43% probability. This assessment is done by the image recognition engine 121a using a trained model trained by machine learning which is built beforehand.

In S313, the CPU 119 converts the value B to the content b. And, the CPU 119 designate the content to the quality tag M=m. If the results of S312 is not numerical but words, S313 will be skipped.

In the case above that the tag item is "object", the CPU 119 converts the text and value data "cat: 0.87, ball: 0.81, tree: 0.64, dog: 0.41, bed: 0.18" to the general tag "tag object=cat, ball, tree". In this step, the user 101 can designate a threshold used for selecting which value data is associated with the contents. In this case, the user 101 designates the threshold as 0.40, then the CPU 119 converts only contents which has numerical value higher than the threshold 0.40.

In another other case, the value B can be converted as into a rating system such as 5 star rating. For example, in a case that |0.00|<probability<|0.20|, the value can be converted and indicate that the image is to have 1 star. In another case that |0.80|<probability<|1.00|, the value can be converted and indicate that the image is to have 5 stars. By applying this rule to the example shown above, the tag can be converted as "cat: 5 stars, ball: 5 stars, tree: 4 stars, dog: 3 stars, bed: 1 star". The thresholds for determining when an image is to be 2, 3 or 4 stars can easily be set and need not be discussed.

In the case above when the tag is "emotion", the CPU 119 converts the text and value data "happy: 0.86, sadness: 0.12, surprise: 0.43" to the general tag "tag emotion=happy, surprise". In this step, the user 101, similarly as discussed above, can designate a threshold to choose which content value is associated with the image. In this case, the user 101 designate the threshold as 0.20, then the CPU 119 converts only contents which has higher probability than the threshold 0.20. In the embodiment where the value is converted into a rating system as noted above, value B also can be converted as 5 star ratings. By applying this rule to the example shown above, the tag can be converted as "happy: 5 stars, sadness: 1 stars, surprise: 3 stars". While described in words herein, when shown appended to an image, the number of stars in the rating can be displayed as images of stars.

On exemplary manner employed by the image processing system to identify tag values used as general tag M where the tag type is object or subject, is described hereinafter with respect to FIGS. 13-17. According to the exemplary tagging process used to derive tag values for object/subject, the image processing system executes a visual search process on the image input to the cloud server 103. A visual search interface is provided which makes use of an indexed set of image databases. The image databases have image data which have been analyzed to characterize objects and/or subjects within the image data as well as to characterize the image as a whole. The analyzed image data is stored in different databases—one comprising human tagged images and the other comprising images that have been tagged by a trained machine learning model. Generation of the databases will be discussed hereinafter with respect to FIG. 13.

The visual search processing used to identify tag values for tags such as the object/subject General Tag include three general processing flows. First, a pre-trained machine learning model is employed to extract features from the input image. Thereafter, two different results processing algorithms are performed. In one, tag results are retrieved using visual similarity of embedded tags which have be clustered according to a k-means clustering process which identifies the top-k tags generated when processed through a trained machine learning model. In the other, tag results are retrieved using visual similarity of embedded tags which have be clustered according to a k-means clustering process which identifies the top-k tags generated when processed through a trained machine trained using images that were tagged by humans A list of suggested tags according to each are generated and aggregated such that tags which are suggested according to each processing algorithm (human and machine) to suggest the best possible tags for the image and/or items or objects or subjects in the image. Additionally, suggested tags derived by this dual search processing outputs confidence values associated with the each suggested tag which advantageously provides the user with the ability to correctness of the suggested tag. These operations will be discussed in greater detail with respect to FIGS. 14-17.

Performing the visual search using two different trained models, one trained by images tagged by humans and the other trained by images tagged by a pre-trained model, is particularly advantageous. More specifically, human tags frequency after aggregation decreases exponentially, while confidence values for tags predicted by a neural network decrease linearly. Human tags after aggregation are in the range of 0-0.5 and for machine tags (since it is a more consistent tagging model) are in the range 0-1. However, the system trusts human tags more so long as the dataset size is large and tags are frequent and robust. However, it is difficult to create such a dataset so machine generated tags help quickly bootstrap the visual search solution. This is embodied in the index creation processing that will be discussed below in FIG. 13 and applied according to the processing flows and display images illustrated in FIGS. 14-17.

Turning back to the processing performed in FIG. 3, in S314, the CPU 119 determines if the number of the corresponding general tag M reached the maximum number similar to the process described above with the quality tag. In other words, the CPU 119 determines if the CPU 119 has determined that the contents of the image are those which the user chose to give to the image. If it is determined to be true, the processing proceeds to S315. If not, the processing proceeds back to S311, and repeats the operations regarding general tag M=m+1.

In S315, the CPU 119 sends the all numerical values of quality tags N and contents of general tags M with the image ID to the memory 106 of the local PC 102 through the external interface 123 and the network 118. For example, those tag items are "tilt=−1.2, overexposed=0.87, underexposed=0.04, object=cat, ball, tree, tag emotion=happy, surprise" or like that. Other examples are shown in FIG. 8. Or for example, the quality tag N=3, NV 3=1.2, the general tag N=1, content=red.

FIG. 4 illustrates a flow chart detailing the image search procedure performed on the local PC 102 according to the present exemplary embodiment. The processing is realized by the system control unit 111 reading instructions (e.g. a program) stored in the non-volatile memory 117 in the system memory 116 and executes the instructions/program. The processing in FIG. 4 starts when processing proceeds to S207 in FIG. 2.

Figure 6:
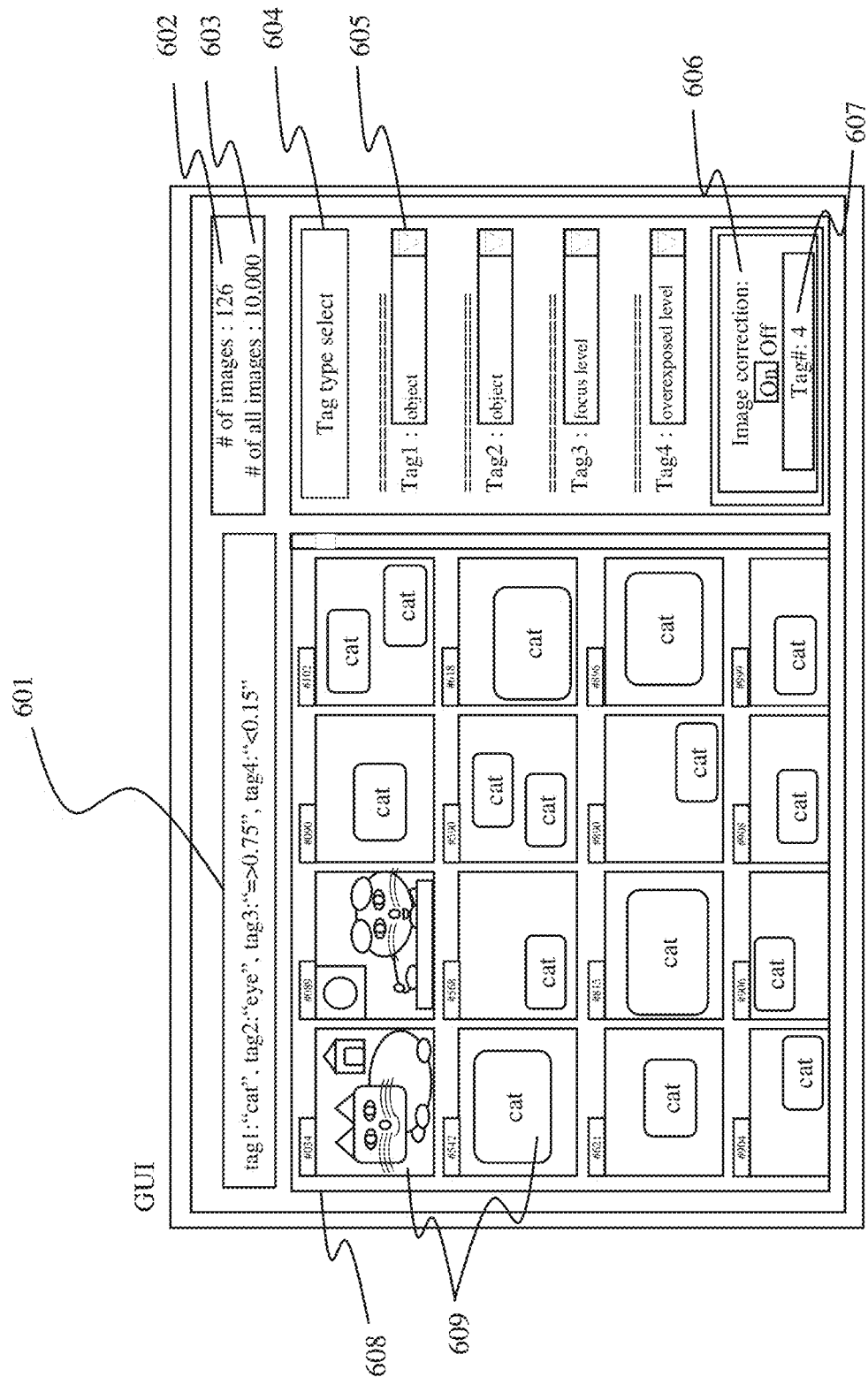
FIG. 6 is an exemplary GUI and image searching operations by referring to tags

In S401, tag items on which the image search will be based are defined by the user 101. The system control unit 111 receives the user's operation to set the tag item(s) which will be used for image search. FIG. 6 shows a display example of image searching by the local PC 102. In S401, as shown in the GUI menu 604, the user 101 can determine tag items which are used in image searching. Here, the user 101 selects tag items which the user 101 wants to use for image searching from the pull down menu 605. In this example, in FIG. 6, the user 101 defines four tags: tag1, tag2, tag3 and tag4 to find desired images as shown in the search box 601. Each tag type corresponds to "object tag, "object tag", "focus level tag" and "overexposed level tag", respectively as shown in the pull down menu 605. In this example, the user 101 can select/determine up to 4 tag items. However, this is merely exemplary and the number of tag items may be more than 4 or less than 4. Further, a user 101 does not have to assign searching criteria for all 4 tag items. In other words, the user 101 may leave any tag items without assigning any criteria. Tag types which the user 101 can determine via the pull down menu 605 are shown in FIGS. 7A and 7B.

When beginning the processing described in FIG. 4 as per S207 in FIG. 2, the tag items in S401 will be decided based on the user determination in S201.

In S402, the system control unit 111 determines if an image in the memory 106 has the tag item selected in S401 or selected in S201. If the image which has the selected tag item, the CPU 101 assigns number to the image. The numbers which will be assigned to the image(s) start from image number=1, and will be increased by 1. The CPU 101 further stores the image ID of the images as the number for the following steps.

When more than one tag items are selected in S401, the system control unit 111 repeats the flow from S402 to S406 for each tag items.

In S403, the system control unit 111 determines if the image whose number n=i has the tag item specified in S401. If it is determined that the image has the tag types, the processing proceeds to S404. If not, the processing proceeds to S406. Therefore, the processing in the next S404 is performed for images which have the tag item selected in S401. The image search is performed from an image whose image ID=1 or an image whose image ID smallest. The order of search is not limited to the order of the image ID as long as all the image is determined in S402.

In S403, the system control unit 111 increases the image ID number so that next image will be determined in S402. As described above, the order of the images which will be determined in S402 can be any order as long as all the images will be determined in S402.

Also, if the system control unit 111 found the predetermined number of the images which has selected tag item and meets the criteria which will be described in S404, the system control unit 111 can stop the further image search. For example, if the user just wants to know what kind of images has the same tag item and meets the criteria, the user does not need to know all the images. For example, it might be more desirable to the user to have the search return some number of images as soon as possible rather than trying to find all the images which has same tag item and meets the criteria and making the user wait longer time.

In S404, the system control unit 111 determines if the content/numerical value of the image meets the criteria defined by the user 101 in S401. If the determination in S404 is positive indicating that the criteria has been met, the processing proceeds to S405-Y. Otherwise, the processing proceeds to S405-N indicating the criteria in determination in S404 has not be met. In S405-Y, the image is displayed on the display unit 110. In S405-N, the image is excluded from the search results and is not displayed on the display unit 110.

In S406, the system control unit 111 determines if, of all the images determined, if each image has the same tag item. Alternatively, the system control unit 111 can determined if the current image ID of the image which is determined in the latest S402 is the largest number. If it is determined that all the image have been evaluated as part of the search processing, the processing ends. If not, the processing proceeds to S403.

Figure 5:
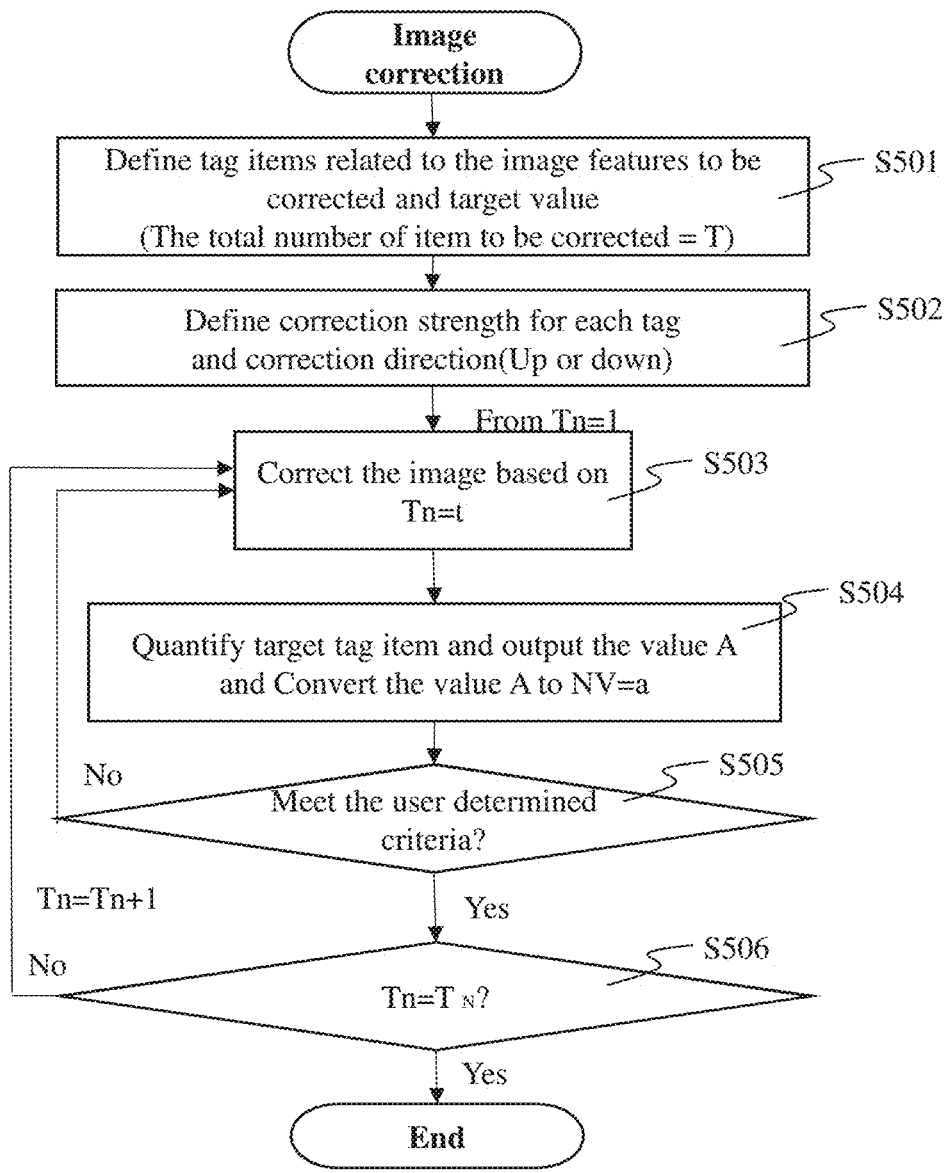
FIG. 5 is a flow diagram of the image correction processing.

FIG. 5 describes a flow chart detailing image correction processing performed by the cloud storage server 103 according to the present exemplary embodiment. The processing is realized by the CPU 119 reading instructions (e.g. a program) stored in ROM 121 and executing the instructions. The processing in FIG. 5 starts when the cloud storage server 103 becomes operable.

In S501, the CPU 119 receives the information that shows tag items corresponding to image features to be corrected. The examples of the image features which will be corrected include but are not limited to "focus point", "noise", "aberration" and so on. Processing of S501 is performed by the instruction which is received from a user via the display of the display unit 110.

Additionally, the user 101 defines the target numerical values and/or content for the correction. The target numerical values and/or content are referred to as correction criteria. Features defined by user 101 in S501 are to be corrected in the following steps. The tag items which corresponds to the image features to be corrected is Tn and the total number of Tn is N.

In S502, the CPU 119 defines the correction strength and direction for image searching. The correction strength indicates how much (e.g. degree) of the correction to be performed. For example the user 101 can select from strong, middle, weak. The type or direction of correction for noise is to enhance noise or reduce noise. If the direction of correction for noise is down, the noise in the image will be reduced. The strength value indicates how much the correction of a specific item corresponding to the tag would be performed for the image. When the strength is strong, the correction of noise is performed more than the predetermined strength/amount. How much the correction will be performed is predetermined depending on the selection of the correction value being one of strong, middle or weak. On the other hand, in the case that the strength is weak, the correction is performed to reduce the noise less than predetermined strength/amount. And, the CPU 119 recognizes how much the noise level is to be reduced by the correction before finishing the correction processing. For example, the user 101, via the display, can define the correction strength of noise and direction as "strong" and "down" resulting in a strong noise reduction correction being performed. The selection of the strength is not only limited to the selection of three levels, but a selection of number defining the strength may also be input by the user.

Then, the correction is performed from the Tn=1.

In S503, the CPU 119 performs image correction for the image based on the item of Tn=t.

In S504, the CPU 119 quantifies the image based on Tn, and outputs the value A and converts the value A to the numerical value n=a or outputs the value B and converts the value B to the Cn=b. This processing is the same as shown in S308/S312 and S309/S313 in FIG. 3 and need not be discussed. When the correction criteria is word and not number, S504 is to be skipped.

In S505, the CPU 119 determines if the numerical value n or the Cn meets the criteria defined in S501. If the CPU 119 determines that the numerical value n or the Cn, processing proceeds to S506. And if not, the processing proceeds to S503.

In the image correction flow, the user 101 can modify the correction criteria at any time in the case such as the image correction processing appears not to reach the target numerical value, or in the case where the processing seems to take a lot of time. For example, the criteria regarding noise level is modified from 0.10 to 0.20. The numerical value of 0.20 is easier to reach for a correction algorithm, and the user 101 can have the corrected image without consuming a lot of time.

In S506, the CPU 119 determines that the number of tags Tn reached the total number T. If it is determined the processing proceeds to the end. Otherwise, the CPU 119 goes to see the next tag Tn=t+1 and back to in S503. The processing is repeated until the tag number Tn reaches T.

Figure 11:
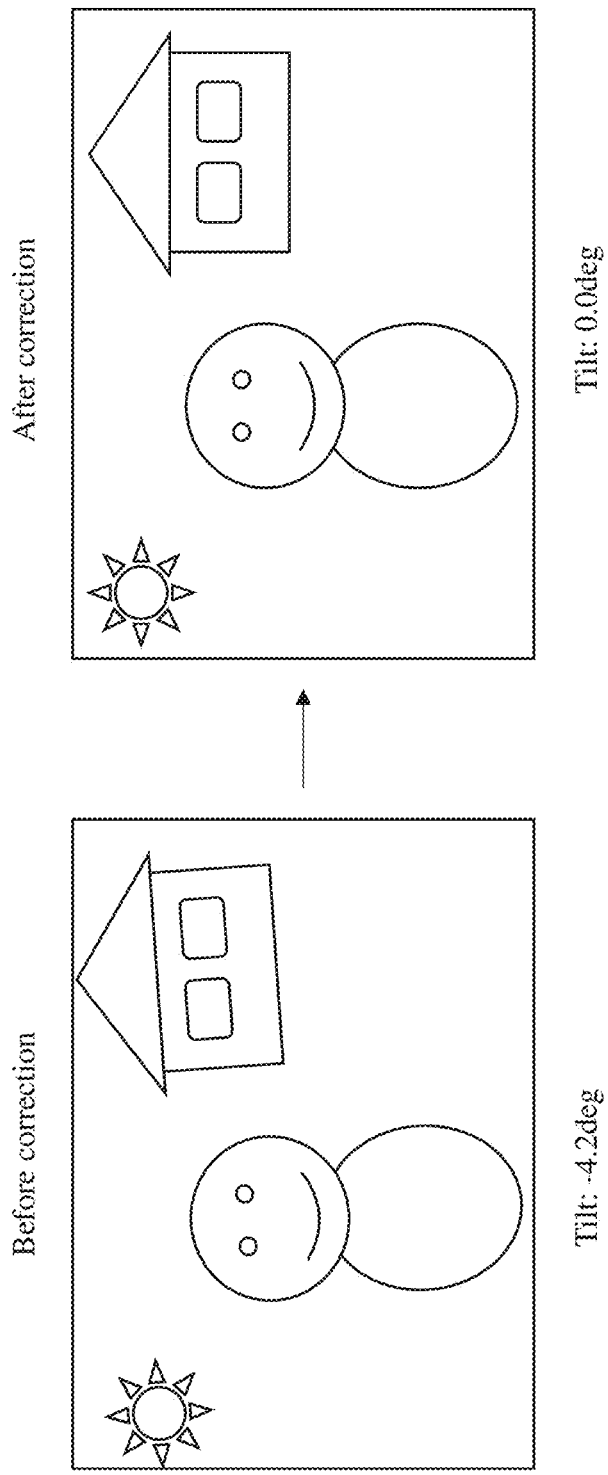
FIG. 11 is an example image correction.

Other correction examples are shown in FIG. 11 where correction for tilt is performed when the tag of tilt is selected by the user. Before the correction the CPU 116 recognized the image as it has a tilt −4.2 degree. After the correction, the CPU 116 recognizes the image as it has a tilt of 0.0 degree. Through such correction procedure, image features specified by tags can corrected.

FIG. 6 shows an example image of corresponding graphical user interface to search images. In FIG. 6, a user defines four tags tag1, tag2, tag3 and tag4 to find desired images as shown in the search box 601. Each tag type corresponds to "object tag, "object tag", "focus level tag" and "overexposed level", respectively. These are changeable through the GUI menu 604 and pull down 605. A user also can change the number and types of tags at any time to modify the searching criteria. In this example, the user filled out the words and values for each tag as tag1: "cat", tag2: "eye", tag3: "=>0.75", tag4: "<0.15". By defining tags in this manner, the system can search images that have a cat and at least an eye, and which have focus level equal to or greater than 0.75, and has an overexposure level smaller than 0.15 out of all images (as shown herein the total number images are 10,000) as shown 603. In this case, the number of images that meets the pre-defined criteria is only 126 as shown 602. The images which meet the criteria are shown in the display 608 with thumbnails 609. In addition, a user can select to change an image correction setting by accessing 606 and 607. In this case, the images are to be corrected based on the tag4=overexposed level. In this manner, a user can search desired images easily and effectively. In addition, this searching method is greater than existing techniques because this way can use not only qualitative tags (e.g. object), but also quantitative tags, and get desired images much easier by combining those tags.

In this embodiment, the user 101 can search images by combining some type of tags. The tags can contain both tags quantitatively extracted from the image based on specific processing explained above and tags assigned without such a specific processing, such as objects. Therefore, the user 101 can search desired images easily through a procedure based on combined tags in which not only is an object tag such as "cat" used, but also a sharpness tag such as "sharpness level>0.8". This effectively reduces the number of images returned by the search because the user 101 does not need to view a larger data set only to visually narrow it down. Instead, the improved search returns data set that is more likely desirable by the user because not only does the image include the object tag "cat" but also has a desired sharpness quality. Therefore, usability is significantly improved. In addition, since the user 101 can use tags which are quantitatively defined tags and other tags, the user 101 is able to search desired images based on different two points of view that are quantitative image quality criteria defined by the user 101 and non-quantitative criteria such as desired objects and/or image composition information. In summary, because the user 101 can search desired images based on the two different points of view, the a user 101 who is looking for a very particular image with a particular image quality is to find desired images very easily. Moreover, as shown in S306 of FIG. 3, since images which are identified as being in the first image format such as DPRAW format have data other than stored tag data in EXIF, those images can be found based on tags other than tagged data, such as distance information from the object and the image capturing device.

In addition, in FIGS. 7A and 7B, items shown in the FIG. 7A are stored in the memory 106 with the image ID not as EXIF data and items in FIG. 7B are stored in the memory 106 as EXIF data.

In another case, some items in FIG. 7A and FIG. 7B can be stored in the memory 106 as metadata other than EXIF attached to the image. For example, since there are arbitrary memory areas with an image to store any type of data such as makernotes, user unique memo and/or proprietary tag values, as shown in FIG. 8, some items can be stored in such areas. In summary, tag data can be stored in the memory 106 as explained above or as shown in FIG. 8, and how to store the data can be selected depending on situations.

FIG. 7A shows a tag list of quality tag N, and FIG. 7B shows a tag list of general tag M. Values of each feature corresponding to quality tags is decided through an image evaluation explained in FIG. 3.

FIG. 8 shows types of tags that may be used in accordance with the embodiments. Each item of tags is stored by text and number as shown in FIG. 8. All items listed in FIG. 8 are described below.

Sharpness: Sharpness shows how much a part of whole of the image are sharply taken. Generally, sharpness can be quantified by assessing contrast and spatial frequency distribution of the image. In some cases, those are evaluated in spatial frequency domain by aggregating power coefficient of each basis define by a transform method such as Fourier transform, discrete Fourier transform, and/or discrete cosine transform.

The numerical sharpness value of part or whole of the image may be stored as a two dimensional map. This two dimensional map may be displayed as a grey scale image, where areas of high sharpness may be denoted in white, whereas areas of low sharpness may be denoted in black, whereas areas of varying level of sharpness in between may be displayed in a grey scale value corresponding to the sharpness of such area. The displayed grey scale denoting sharpness values may be standardized over multiple images allowing for comparison of sharpness between multiple images. With multiple images with similar sharpness distributions, this sharpness map may be used to select and/or identify an image or images with highest sharpness in specific regions. Take for example, an image of a birthday cake with a flame lit candle, where 10 separate images exist where the focus point is on or near the flame of the candle. To search for the most in focus image (the highest sharpness image out of the sample), the displayed area of the flame may be zoomed in, and each image may be checked individually and compared against the sample which is time consuming process. On the other hand, displaying a two dimensional sharpness map for each of the sample images may enable visual identification of the flame with the highest sharpness by selecting the sharpness map with the whitest region of interest from the sample lot. This allows for instant recognition of the highest sharpness image for a given region of interest.

For displaying sharpness maps of only partial images, the region of interest may be created by bounding an area around the focus point data stored in the image EXIF file. For example, a 100×100 pixel box may be bound around the focus point as the center position. This is merely exemplary and the boundary may be varied based on circumstances.

For images without focus point data, an object recognition feature may be used to define a boundary region. For example, for an image where a human eye is detected, a square boundary region of defined pixel width may be drawn around the object to define as the region of interest. For example, a 100×100 pixel boundary may be used. As another example, the boundary region may be defined to be a square where its size is minimal in size to cover the pupil of a human eye, or the boundary region may be defined as an oval to include the entire whites of the human eye. As another example, if a racing car is detected in the image, the boundary region could be defined as to draw a minimum size rectangle around the driver cockpit, or a square around the driver. The boundary region may be defined based on various situations or circumstances. Two dimensional maps of sharpness as discussed above may be generated for the areas within the box to quantify, in images, the sharpest regions.

Focus: Denotes the area, in part of whole, of an image that is in or out of focus. It is generally quantified by the sharpness of the part of whole area of the image.

For images tagged with the Focus tag and its corresponding value, the tag may list a calculated probability that an image, a subject within an image, or a part of the subject within an image may be in focus. The probability of in-focus is determined from training data using large datasets of in-focus images. For example, the level of an image being in-focus can be quantified using human derived inputs of what is perceived to be in-focus. Averages taken from many users and large sample sets will be used to determine the level of focus of the image. In this way, level of focus and the corresponding image will be used as training datasets to generate the model used by the image recognition engine discussed above.

For calculating the probability that a new sample image is in focus, the training dataset with subjects or parts of subjects with given focus values will be referenced, and may be used by the image recognition engine to determine the probability the new image being in focus. In other words, the probability of an image being in focus is calculated based on a program created by using the training dataset to predict the probability of an image being in focus.

Tilt: denotes the degree in which the objects in the image are tilted from the horizontal or vertical line. It can be generally quantified by comparing the edge lines of the objects such as buildings, vehicles and/or ground or the like to horizontal or vertical lines.

The calculation method for the value of the Tilt tag is similar to that of the Focus tag. Tilt recognition engine is created by training using large amount of datasets which contains line that are identified as horizontal or vertical line with respect to the whole image. The lines within the training datasets may also be trained using human inputs. FIG. 12 shows examples of the lines which the recognition engine decides based on the datasets and the angle of tilt is decided based on the horizontal/vertical line which is suggested by the engine and the actual horizontal/vertical line. The tilt values and reference images may be used as training datasets to create the model used by the image recognition engine for tilt calculation. For new images, the tilt values are determined using the trained model. In other words, the tilt angle of an image is analyzed based on a program created by using the training dataset to predict the tilt values of a subject. In further detail, images containing tilt values from the training datasets are compared against the new image to calculate the angle of tilt (in degrees) of the new image. A general assessment of the image's noise, exposure, and dynamic range may be made by viewing the distribution of its pixel values. Noise denotes an image's unwanted signal such as dark random noise, photon shot noise, and defective pixels and/or lines. Exposure denotes the image's overall brightness. Dynamic range denotes the range of an image's dark to bright scenes. For example, an image with both a bright and dark area is said to be an image with a high dynamic range. On the other hand, a low dynamic range image may have entirely bright scenes or entirely dark scenes.

For images tagged with the Noise tag, the value of the Noise may be calculated by taking that sample image and comparing it against a training dataset comprised of images with added noise of a known value. For example, an image taken with a camera in a dark environment will be dominated by dark random noise. For images taken in this situation, the noise level of an image or defined area can be calculated by calculating the standard deviation of the pixel values. As an example, a scene with high noise will correlate with a high standard deviation, and a scene with low noise will correlate with a low standard deviation. In a similar fashion to Tilt and Focus tags, values contained within the training datasets may also be trained using values from human inputs. Noise levels determined in this manner may be used as training datasets. For tagging noise values to new images, noise values may be determined using the program created by using the training dataset and characteristic noise values.

The performance of the optical elements used to capture an image may be related to an image's aberration, diffraction, distortion, lens flare, and vignetting. These parameters affect how precisely an object is projected on the imaging device as an image. In some cases, these parameters may be used to evaluate the optical performance of an imaging device. Aberration, diffraction, and distortion are related to light propagation as waves and may be described theoretically by wave optics. Typically, these optical phenomena affect image quality in the peripheral region or the image as a whole.

Lens flare typically shows up on an image when strong incoming light comes into the field of view of an image, and is generally caused by multiple reflections of incident light on the surfaces within the imaging device such as a lens element, image sensor, or camera body. It may also be created purposefully and used for artistic expression.

Vignetting is a decrease of light in the peripheral region of an image. The amount and shape is related to the shape of the optical elements and light angle dependency of the image sensor. It may be assessed by viewing the distribution of the amount of light on an imaging plane.

For the fifth tag above, there may be instances where a numerical value is calculated and displayed on the tag, or both a numerical value and a text field identifying the type of phenomenon may be displayed. For example, a tag type with Aberration may have "Aberration Type, Degree=Chromatic, 1.9" listed in the tag fields. A tag type with Lens Flare may have "Flare Type, Degree=Circle, 0.01".

In addition, those types of features may be simulated by referring to the shape and materials used in the optical elements and the optical system. Furthermore, these optical phenomena abide by the laws of physics, and the propagation behavior can be simulated and analyzed. Therefore, estimates can be calculated based on the laws of physical optics and by using the optical properties of the optics, camera, and sensor which are known. These predictions may be calculated using theoretical equations of wave optics, or FDTD (Finite Differential Time Domain) simulation methods. By knowing the changes in optical properties of optical elements by varying focal length and F number, the camera's and sensor's optical properties, the combination in which an imaging system can be structured, and calculating the propagation properties of an imaging system allows for an understanding of the types and degrees in which varying types of phenomenon may occur.

On the other hand, there are additional methods of calculating values through creating different calculation algorithms than the above which consider the numerous combinations of optical elements, cameras, and sensors as an imaging unit. The subjects in these images may vary from normal scenery or persons, or test charts and patterns. A training dataset may be created by inputting the resulting type of phenomenon and the degree in which it occurs through detailed observation by a human. For example, for sample image A, a tag may be created with "chromatic aberration level—0.24, diffraction level=0.46, barrel distortion level 1.4, circular lens flare=0.2, vignetting=0.78". In other words, the training data for training the AI Engine are plurality of set of image itself and numerical values or words of each tag for the image. As a result of inputting the training data and training, the AI Engine will be able to output the numerical values or words of each tag when the image is input to the AI Engine as the input data. A sufficient training dataset may be created by tagging a large volume of images in this manner. A program with the ability to identify the type and degree of optical phenomena can be created by applying the training dataset to the AI Engine. More amount of the training data would increase the accuracy of result of the quality tag and the general tag for the input data.

As for color and dominant color, this shows which colors are used in an image and which color is dominant in the image. This may be determined by viewing the histogram of the image in each color plane.

For example, by separating an image into red, green, and blue color space values, and observing each value of a specific pixel allows for calculation of the color of that pixel. By applying this calculation to the entire pixel array in an image, the color map of the image may be created. Afterwards, a histogram of each type of color may be made to determine the dominant color within a given image. Another method in which this may be performed, similar to using training datasets as mentioned previously, is to create a large training dataset of images with tags based on human inputs, and estimate values using a program based on these training datasets.

The composition means position, configuration and/or angle of the objects in an image. For example, a rule of thirds is one of the composition type, and that means that the image is divided evenly into thirds, both horizontally and vertically, and the subject of the image is placed at the intersection of those dividing lines, or along one of the lines itself. It can be decided by seeing the geometry of the objects in an image. Other composition types generally can be described in a way similar to the rule of thirds as described above.

To identify a composition, estimates can be made using a method such as semantic segmentation which separates an object into regions, and calculating the position and center point of each object. Another method in which this can be performed, similar to using training datasets as mentioned previously, is to create a large training dataset of images with tags based on human inputs, and estimate values using a program based on these training datasets.

As commonly used in the computer vison field, items of the object, the subject, the eyes open/close, the red eye and the emotion can be tagged by the image recognition engine trained beforehand for each item.

Identified here previously was a method in which the image analytic engine is used, but other methods of analysis and identification, for example an eye open/close or redeye, can be made by creating an analysis method based on a rule around the shape of the human eye. For example, by creating a hexagonal shape similar to the human eye, and observing the area or height and vertical ratios may be used to identify if an eye is open or closed. Additionally, analyzing the colors contained within the hexagonal shape, a shape with a prominent red color space may be identified as a redeye.

The object and the subject means what is in the image and which one is dominant in an image. The eyes open/close and red eye shows if there are open and/or closed and/or red eyes in the image. The emotion means what kind of emotion the image may have. It may generally be expressed as happy, sadness and/or joy or other emotions.

As a method of identifying tags types and its values, a method of analyzing an image and determining its value, and utilizing other datasets outside of the image to determine its value was presented. An example to the former is the method in which the sharpness of an image can be analyzed. An example to the latter is the method in simulating the lens and camera data used in capturing the image. Another method is to create a large training dataset of images with tags and values based on human inputs, and estimate tags and values using a program based on these training datasets.

These various methods can be utilized individually or as a combination. There are cases where a combination increases its precision. For example, in calculating the noise, there may be an image with high contrast and patterns across the entire image, making the identification of an appropriate region difficult. In this case, a more robust estimate can be made by averaging the results of various methods. As an example to other methods, estimates from programs created by previously known exposure and noise data, camera specific data, and human derived training datasets may also be used. Here, an example using noise was presented, but other types of tags may also utilize a combination of analysis methods to calculate outputs.

Figure 9:
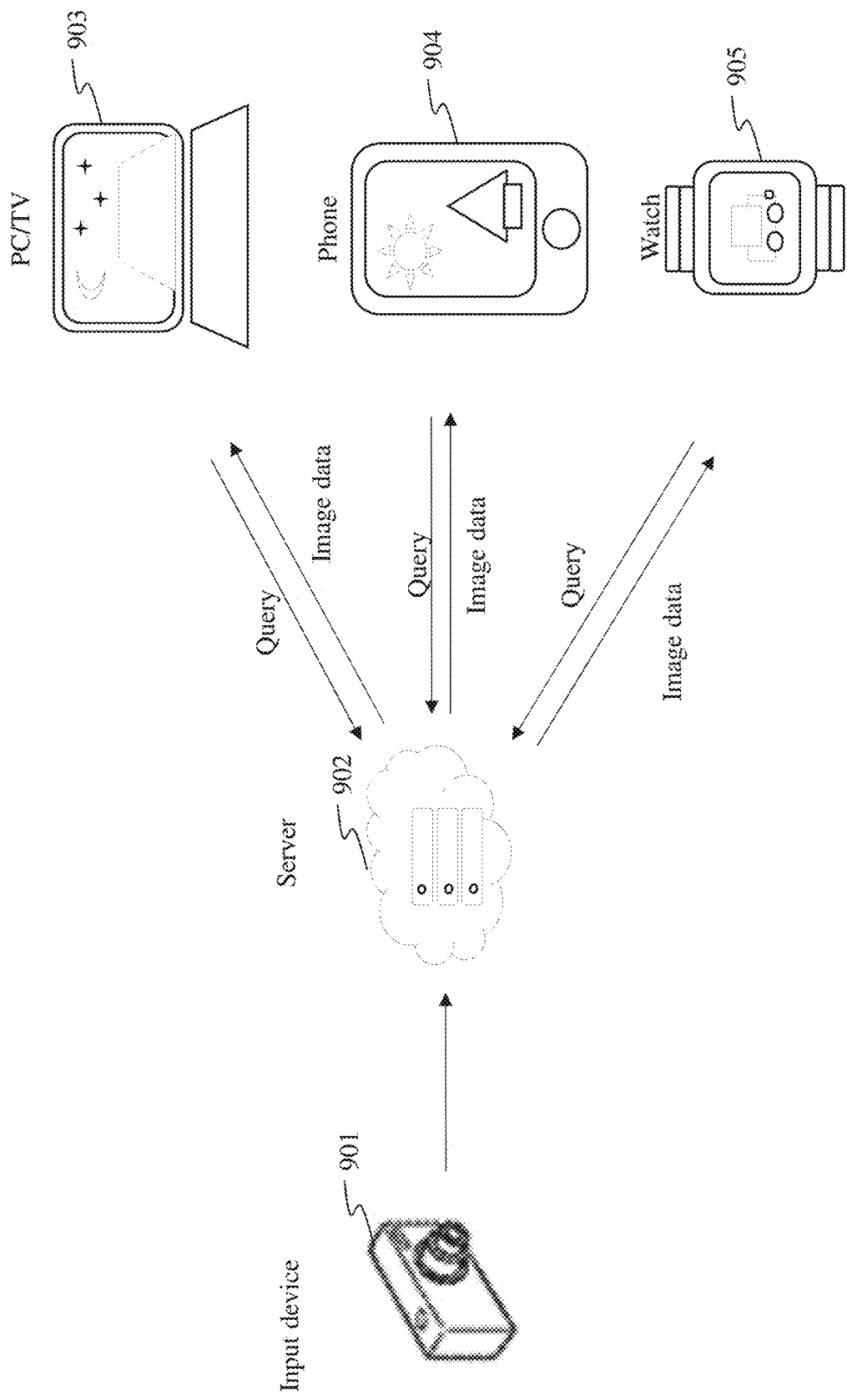
FIG. 9 is an alternate embodiment of the system.

FIG. 9 explains one example of a use case of the system. Input device 901 is an imaging device which has a capturing unit having a lens which can capture image data there through and which is translated by an image sensor into digital image data. The other configuration of the input device 901 is the same as illustrated in FIG. 1B and image data to be given searching tags are stored in the memory 106. The input device 901 sends data to a server 902 for image processing. The image data may be viewed on a viewing device which is a computing device 903, a smartphone/tablet 904 and/or a wearable computing device such as a watch 905 each of which includes a display. The viewing device can transmit query data which has at least one type of tags and words/values to be used in search processing. The server 902 can search images in the input device 901 or the server 902 based on the query and send images which meets the criteria to one or more of the viewing device 903-905.

Figure 10A:
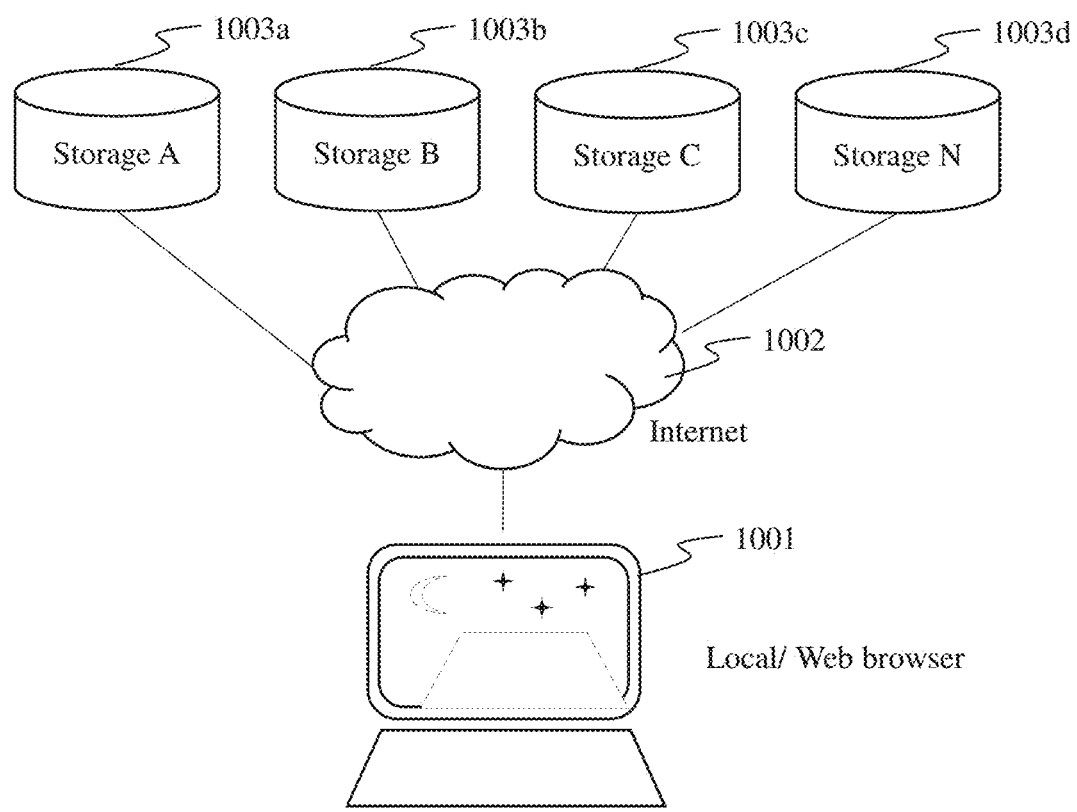
FIG. 10A is another example of image search processing.
Figure 10B:
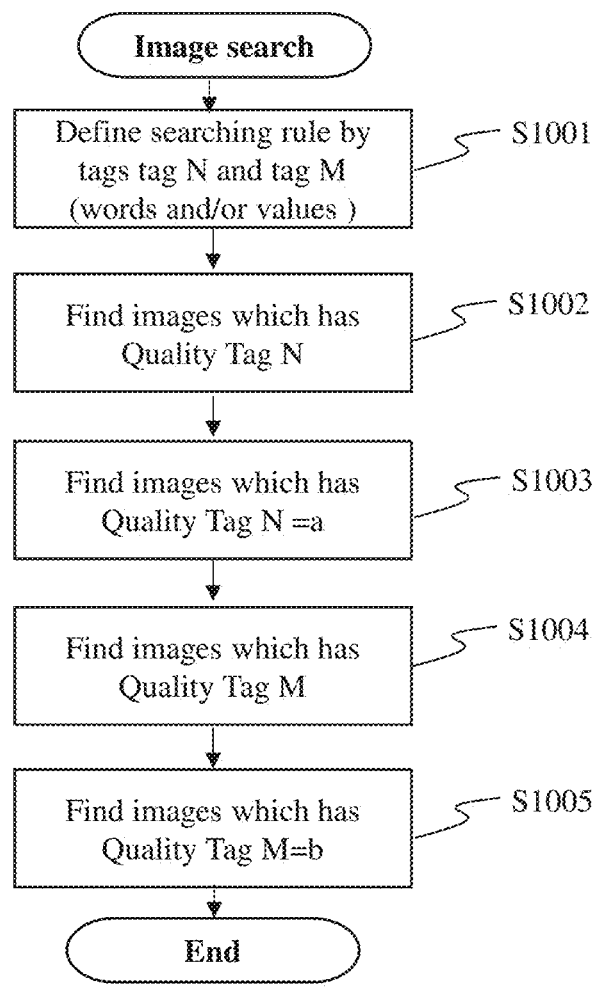
FIG. 10B is a flow diagram detailing the searching flow.

FIG. 10A explains a further use case for searching images stored on the web storage from local device. Local device 1001 is connected to internet environment 1002, and it is connected to storages 1003a, 1003b, 1003c, 1003d. User can search images on those storages 1003 by specifying searching criteria on the local device 1001. FIG. 10B shows a flow chart to search images. In step S1001, user defines a searching rule by specifying tags and values for the tags. In step S1002, the system finds matches which have quality tag N, and in step S1003 it is sorted by the criteria defined in the step S1001. In step S1004 and S1005, another search and evaluation are performed as for tag M.

The embodiment of the examples provided within referred to storing and referencing data in an image's EXIF file. However, tag data may also be stored on RAM 120 or RAM 121 on cloud storage server 103 and referenced as needed for performing image search queries on Local PC 102. For example, tag data of simple text or JSON for description of objects can be stored on cloud storage server 103. During an image search, the query of the tag specified by User 101 is transferred to CPU 119 on cloud storage server 103 by system control unit 111 on Local PC 102.

The image or image ID matching the desired search result is selected by CPU 119. Then that image, image ID, or both are sent to the local PC 102 by cloud storage server 103. Afterwards, an image is displayed on Display unit 110 according to the flow similar to that shown following S405 on FIG. 4.

Figure 13:
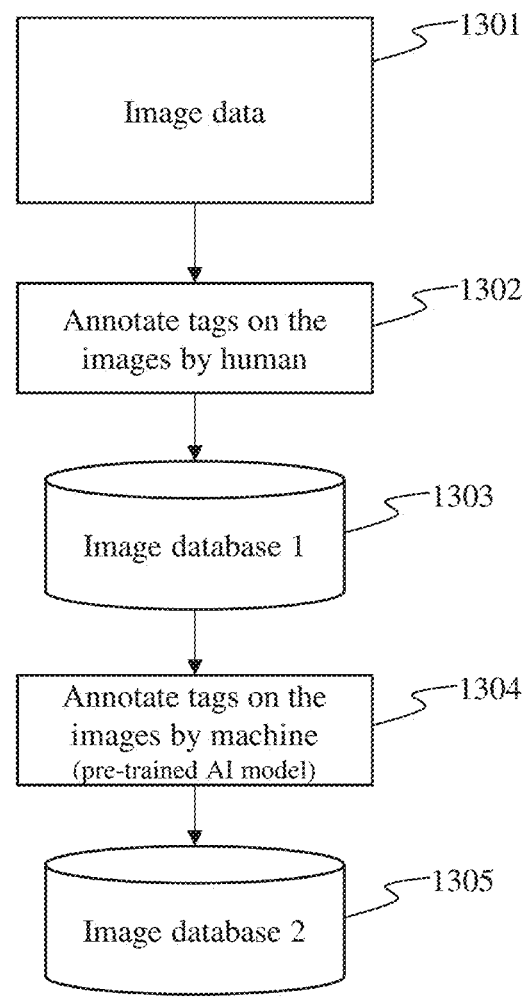
FIG. 13 is a flow diagram for image processing.
Figure 14:
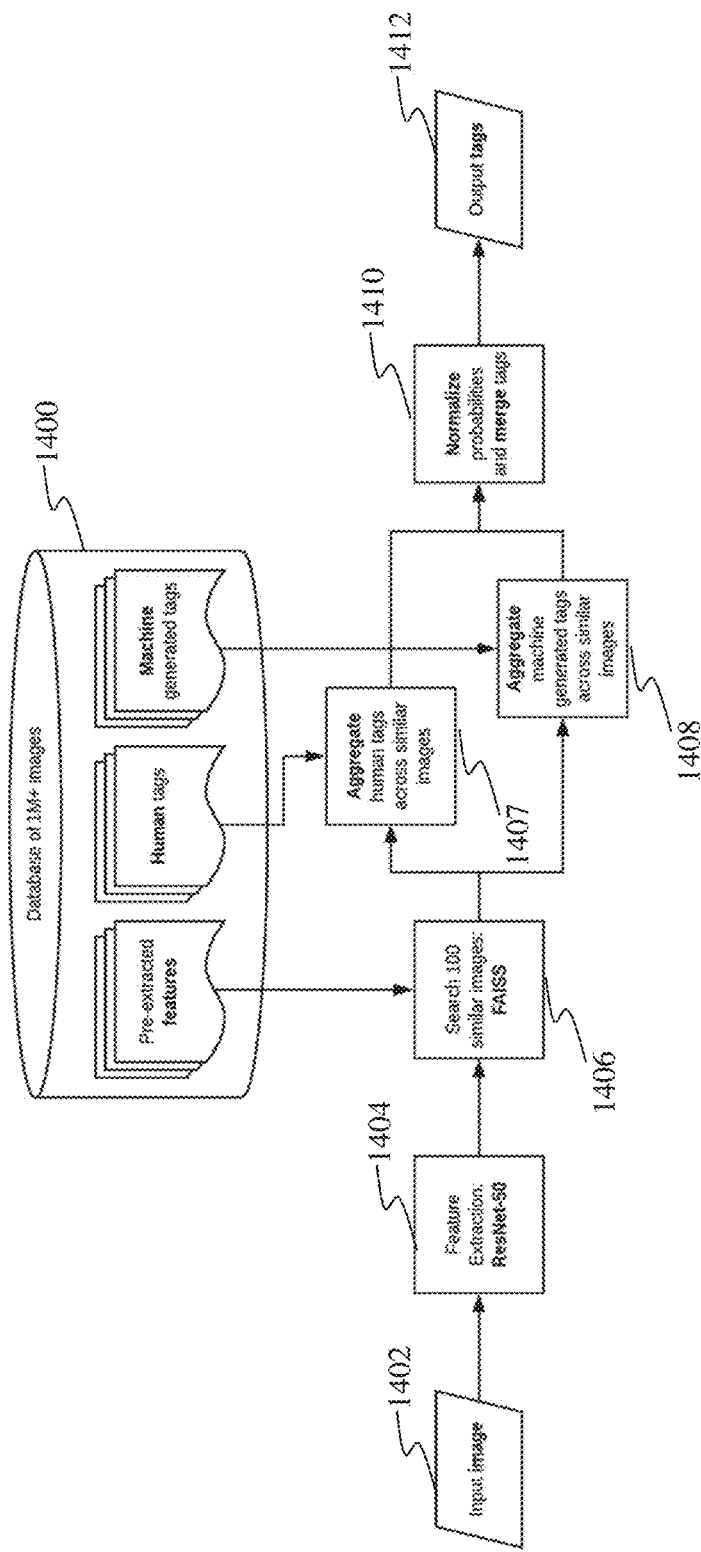
FIG. 14 is a flow diagram for image analysis.
Figure 15:
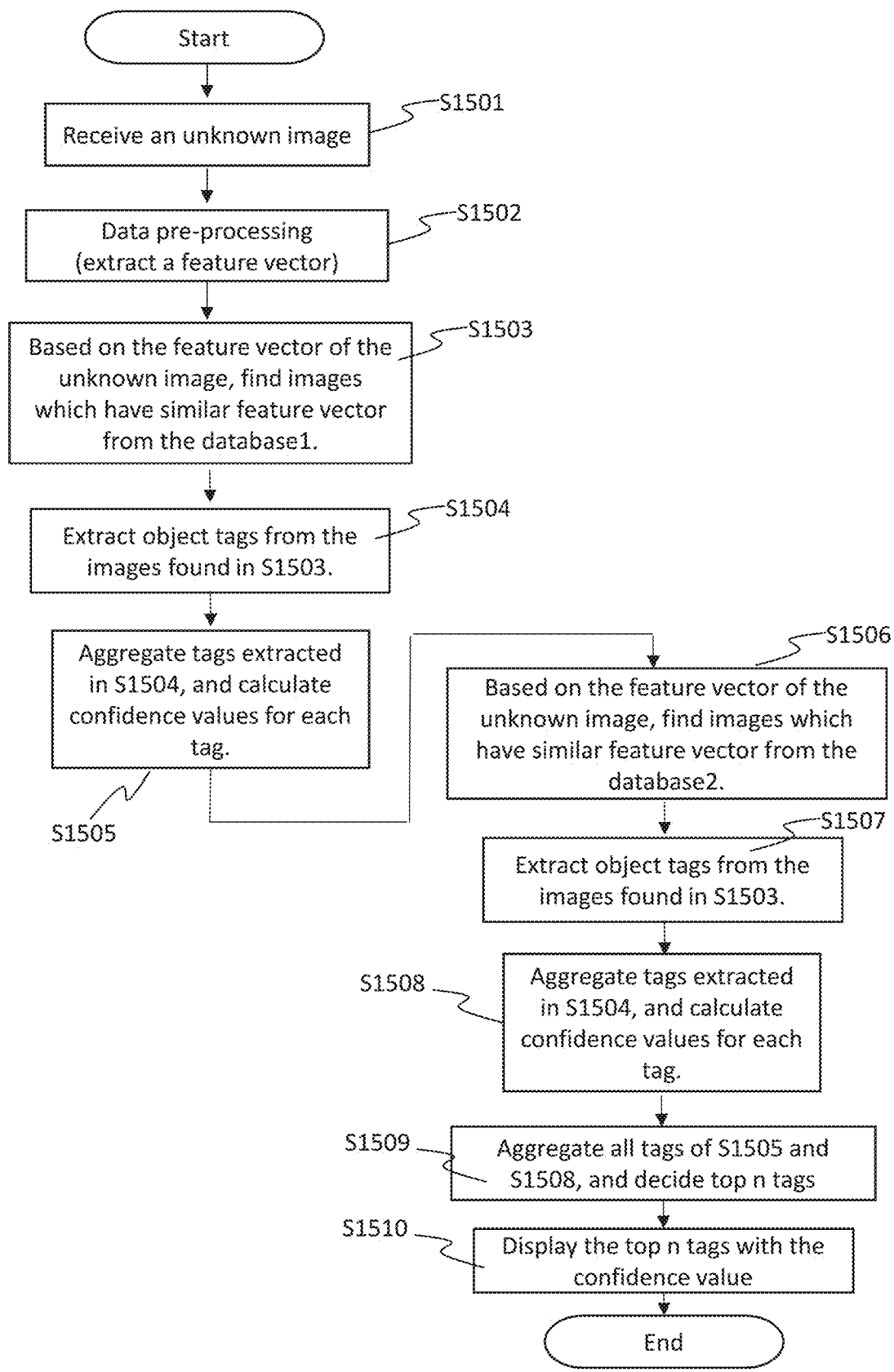
FIG. 15 is a flow diagram for image analysis.

FIGS. 13-17 provide a more detailed description of the tagging operation discussed above in FIG. 3. While the following can be integrated as noted above, the following tagging operation need not be integrated and provides a description of a visual search interface that advantageously uses two different trained machine learning models to determine one or more suggested tags. FIG. 13 describes the processing used to generate two image databases before image searching is performed. In the image searching, as shown in FIG. 14, both databases are referred to determine tags for unknown input images.

In S1301, the CPU 119 receives an input image. In S1302, the CPU 119 generates one or more user interfaces that request a user (e.g. humans) to annotate the input image with one or more tags. In fact, the more tags received by the user for each image is preferred. For example, an image having a car therein can be tagged generally as "car" and further tagged with more specificity such as the type and/or class of car such as "taxi" and "hybrid car". This is merely exemplary and an image can have any number and types of tags as seen fit by the user who is annotating the image. In S1303, the CPU 119 saves the image and the annotated tags in the image database1. The database can be stored in the RAM 120 or the ROM 121. The annotated image data in the database1 can be used to determine tags for unknown input images.

In S1304, the input image is fed into an image recognition engine 121a which is trained beforehand to recognize objects in images. In this step, the image recognition engine generates one or more tags for the input image and, in S1305, the CPU saves the image and the annotated tags in the image database2. Similarly to image database1, image database2 can be stored in the RAM 120 or the ROM 121. The annotated image data in the database2 can be used to determine tags for unknown input images.

FIG. 14 is block diagram illustrating the visual search processing used to generate suggested tags for an input image. The operations performed at the various blocks in FIG. 14 will be described in detail via the flow diagram of FIG. 15.

Generally, the visual search and tagging operations include an input phase, an indexing phase, a search phase and an aggregation phase whereby results of the search phased are processed in order to determine the tags suggested for the image along with a confidence value associated with each of the suggested tags.

Block 1402 illustrates the input phase whereby one or more untagged images are fed into the image processing algorithm described herein. This process is performed in S1501 whereby an image is received from an image source including but not limited to, an image capturing device and/or a computing device having a data store with one or more images that were previously captured. The untagged images input in step S1501 can be on a local computing device or stored in remote storage such as a cloud storage system.

Blocks 1404 and 1406 of FIG. 14 illustrate the indexing phase associated with indexing performed on the image input in 1402. S1502 illustrates the data-preprocessing step performed in 1404. More specifically, in S1502, feature extraction processing is performed on the input image to determine feature sets that can be used as an input to an image search algorithm in 1406 in order to return images that are similar and which are tagged in order to extract suggested tags for the input image in 1402. The feature extraction processing includes clustering is performed using a similarity search algorithm to perform an indexing operation. One exemplary type of algorithm is known as the Facebook AI Similarity Search (FAISS) algorithm, but any type of similarity search algorithm may be employed. This includes generating embeddings (1 embedding for each image. The embeddings for each image are compressed to lower dimension using principal component analysis (PCA) and get as output embeddings-pca for each image. Quantization processing is preformed to compress embeddings-pca with product quantization (PQ) and clustering to get embeddings-pca-pq for each image. The result herein is that the embeddings form an index for image generated using a neural network (or other trained model).

Upon completion of the feature extraction and indexing search processing for similar images (e.g. images having similar feature to those extracted from the input image is performed in S1503 and represented in 1407 in FIG. 14. This search is performed within image database1 which is set of image data that has been tagged by the user (e.g. human tagged image data). In S1504, tag data are extracted from one or more images returned in the search in S1503 and the tags are aggregated such that a confidence value associated with those tags is calculated. The result of this search is a list of visually similar images ranked by similarity of an input image to each of these candidate images as well as a list of tags with confidence values.

Block 1408 in FIG. 14 calls for the processing in S1506-S1508 to be performed. The processing of S1506-S1508 are the same as described above in S1503-S1505 with the exception of the source of data being searched. In S1506-S1508, the image data being searched is image database2 which is set of image data where each image has tags generated by a trained machine learning model. Using the dual visual search across human tagged image data set and machine tagged image data set is advantageous because human tag frequency after aggregation decreases exponentially, while confidence values for tags predicted by a neural network decrease linearly. Thus, while human tags are more trusted if the dataset size is large and tags are frequent, it is difficult to create such a dataset so machine generated tags help quickly bootstrap the visual search solution to provide a more robust set of overall image data from which suggested tags can be extracted.

Figure 16:
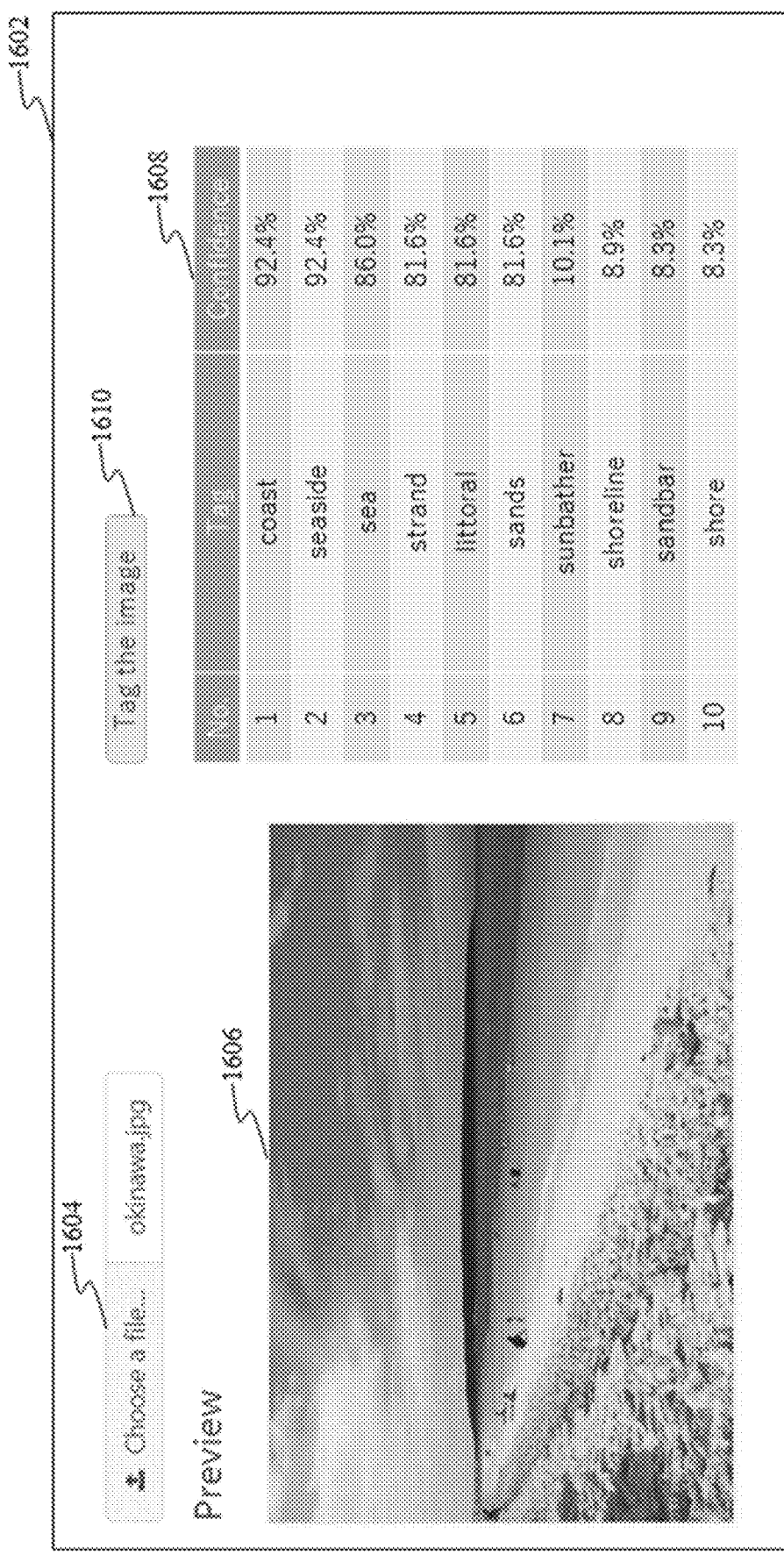
FIG. 16 is an example graphical user interface (GUI).

After aggregation in 1407 and 1408 of tags based on the two datasets, total aggregation occurs at 1410 whereby the probabilities of each tag being accurate are normalized and merged to then be output in 1412 for example as a user interface display elements shown in FIGS. 16 and 17.

In S1509, the CPU 119 aggregates all tags determined in S1505 and S1508 and determines tags to display as a final results with confidence values. In one exemplary output, the aggregation can take the output individually from S1503-S1505 which indicates that suggested tags for the input image is "A, B, C, D, E" and S1506-S1508 which indicates that suggested tags for the input image is "F, A, G, E, I". The aggregation may then compare common tag values and aggregate the suggested tags as "A, E" because both of these appeared in the individual outputs discussed above.

The aggregation step in S1509 also performs a transformation on the suggested tags returned from S1503-S1508. In this transformation processing, a predetermined cutoff value is applied to the confidence values of the human tags. In one embodiment, this predetermined cutoff value is 0.5. The human tag value are shifted by ½ times the machine score at the corresponding position. This shifting is performed without analyzing the suggested machine tags output at S1508. This is particularly advantageous because thus shift enables the human tag confidence values to be comparable with the machine tag confidence values because the machine tag values are generate larger in absolute value. Thus, this shift makes sure that each human tag is near or above the corresponding machine tag position in the suggested output list. A grouping is performed where tag labels from both the sum-shifted human tag list output at S1505 and the machine tag list output at S1508. Any resulting value is truncated above "1" as this is a confidence probability value.

Examples of this sum-shift processing is described in Tables 1 and 2 below:

TABLE 1

| Human | | Machine | | Human-shifted by machine/2 without looking into tag names | group by new human + machine | Final tags | Final with cut-off |
|---|---|---|---|---|---|---|---|
| 0.4 | dog | 1 | cat | 0.4 + 1.0/2 | dog | 1.75 | 1 |
| 0.3 | tree | 0.9 | dog | 0.3 + 0.9/2 | cat | 1.4 | 1 |
| 0.1 | field | 0.8 | horse | 0.1 + 0.8/2 | field | 0.8 | 0.8 |
| 0.01 | cat | 0.5 | wildlife | didn't pass a threshold cut-off of 0.05 | horse | 0.5 | 0.5 |
| | | | | | tree | 0.9 | 0.9 |

TABLE 2

| Human | | Machine | | Human-shifted by machine/2 without looking into tag names | group by new human + machine | Final tags | Final with cut-off |
|---|---|---|---|---|---|---|---|
| 0.4 | dog | 1 | cat | 0.4 + 1.0/2 | cat | 1 | 1 |
| 0.3 | tree | 0.4 | dog | 0.3 + 0.4/2 | dog | 1.5 | 1 |
| 0.1 | field | 0.3 | horse | 0.1 + 0.3/2 | horse | 0.25 | 0.25 |
| 0.01 | cat | 0.1 | | | tree | 0.4 | 0.4 |
| | | | | | field | 0.3 | 0.3 |

Once aggregated, there are some options to determine final tags. For example, since human annotated tags usually have higher confidence values, human tags can be biased to affect more to the final results according to the following tag confidence formula:

Confidence=(Human*X+Machine*Y)/(X+Y)

Where Human represents a confidence value that the human tag is correct and Machine represents a confidence value that the machine tag is correct. In this formula X and Y represent biases associated with each of the tag values in order to preference one or the other. In an example where the human confidence value is preferenced over the machine tag, the bias value X applied to the Human tag may be 2 and the bias value Y applied to the machine tag may be 1. Thus, in an example where the suggested tag is "Dog" and the confidence value associated with the human tag is 0.68 and the confidence value associated with machine tag is 0.42, the above aggregated confidence value can be calculated as follows:

Confidence=(0.68*2+0.42*1)/(2+1)=0.59

The result of the above aggregation processing performed in S1509 is advantageous because the output for the tagging is more stable than raw predictions from a machine learning model due to the influence provided by the human tag results. An example of the improved tag suggest processing output at S1510 is shown in FIG. 16.

FIG. 16 depicts a screen 1602 that is caused to be displayed by the system control unit. The screen 1602 includes a selection icon 1604 that enables a user to select, from a source of image data, at least one input image to be processed. Selection of at least one image causes the selected image to be displayed in region 1606. The image displayed herein is the input image. Tagging processing is performed as discussed above and table including one or more suggested tags that could be associated with this image is shown in output region 1608. The information in region 1608 is that output in S1510 as discussed above. From there, a list of suggested tags to be associated with this image along with the confidence score that the suggested tag is correct is displayed. To associate the tags with the image in region 1606, user may select tagging icon 1610 which causes association processing to associate the tag with the image. In one embodiment, selection of the tagging icon 1610 causes all tags in the list in 1608 to be associated. In another embodiment, one or more individual tags in the list are selectable and can be associated via the tagging icon 1610.

Figures 17A, 17B, 17C:
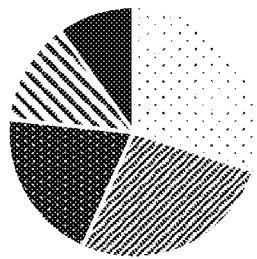
FIG. 17A-17C are example GUIs.

FIG. 17A-17C illustrate other embodiments for displaying the suggested tag list in region 1608. In FIG. 17A, region 1608 may includes two separate lists that more clearly indicate the source that caused the tag value to be generated. FIG. 17A illustrates two separate lists, one including tags suggested via the trained machine model with machine generated tags (e.g. output of 1508) and another list including tags suggested via trained model with human generated tags (e.g. output of 1505). These tags may be illustrated in FIG. 17A according to the calculated confidence value. In FIG. 17B, the suggested tag list in region 1608 may be single list with suggested tag at ranked positions according to the calculated confidence value but displayed together. This allows the user to see the tag with the highest confidence values from the respective source. In one embodiment, the manner in which the suggested tag generated by machines is different from the way the human suggested tag is displayed. FIG. 17C is yet another manner in which the suggested tags can be displayed as a pie chart.

The control performed by the above-described system control unit 111 may be performed by one piece of hardware, or the entire apparatus may be controlled by a plurality of pieces of hardware dividing the processing among the pieces of hardware.

Further, according to the above-described exemplary embodiment, although a case is described in which the present disclosure is applied to a PC, the present disclosure is not limited to this example. For example, the present disclosure can be applied to any apparatus, as long as the apparatus is capable of displaying all or a part of a plurality of selectable items on a screen, and selecting an item from among the plurality of items by a touch operation. More specifically, the present disclosure can be applied to apparatuses such as a personal digital assistant (PDA), a mobile phone terminal, a portable image viewer, a printer apparatus including a display, a digital photo frame, a music player, a game console, an electronic book reader, a tablet terminal, and the like.

Aspects of the present disclosure can also be realized by a computer of a system or apparatus (or devices such as a CPU, a micro processing unit (MPU), or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a non-transitory computer-readable medium).

While the present disclosure has been described with reference to exemplary embodiments, it is to be understood that the disclosure is not limited to the disclosed exemplary embodiments.

We claim:
1. An image processing method comprising:
   obtaining an image captured by an image capturing apparatus;
   determining characteristic data of the captured image based on inputting the obtained image into an image analysis model trained with images including a predetermined type of characteristic data;

identifying, based on the determination performed by the image analysis model, [,] metadata including a numeric value regarding the predetermined type of the captured image;

updating the captured image with the identified metadata in a first format when the identified metadata represents a numerical value corresponding to the predetermined type of characteristic data being an image quality feature; and updating the captured image with the identified metadata in a second format, different from the first format when the identified metadata represents a numerical value corresponding the predetermined type of characteristic being an image capture parameter associated with the image capturing apparatus that captured the image.

2. The method according to claim 1, wherein the numeric value represents a quality of the captured image with respect to the characteristic data.

3. The method according to claim 1, wherein the numeric value represents at least one of a sharpness, a noise amount, a tilt amount and a distortion amount of the captured image.

4. The method according to claim 1, wherein the numeric value based on the characteristic data represents at least one of a sharpness, a noise amount, a tilt amount and a distortion amount of the captured image, the metadata representing the numeric value is added to the captured image according to a format other than EXIF format, and metadata representing at least one of an exposure time, a F-number, and an image data size is added to the captured image according to said EXIF format.

5. The method according to claim 1, the numeric value represents at least one of (i) a type of an object in the captured image with its accuracy information and (ii) a type of emotion specified from the captured image and its accuracy information.

6. The method according to claim 1, further comprising specifying, based on the numeric value corresponding to the captured image, one or more similar images from among a plurality of images, and performing control causing a screen to be displayed that displays the one or more similar images.

7. The method according to claim 6, further comprising obtaining an operation via an operation screen that designates each of the captured image and a type, wherein the one or more similar images are specified using one or more numeric values corresponding to one or more types designated from among a plurality of types by the user operation.

8. The method according to claim 1, further comprising performing control such that the metadata including the numeric value is displayed on a display screen.

9. An image processing apparatus comprising:
a memory storing instructions; and
at least one processor, that upon execution of the instructions, is configured to:
 obtain an image captured by an image capturing apparatus;
 determine characteristic data of the captured image based on inputting the obtained image into an image analysis model trained with images including a predetermined type of characteristic data;
 identify, based on the determination performed by the image analysis model, metadata including a numeric value regarding the predetermined type of the captured image;
 update the captured image with the identified metadata in a first format when the identified metadata represents a numerical value corresponding to the predetermined type of characteristic data being an image quality feature; and
 update the captured image with the identified metadata in a second format, different from the first format when the identified metadata represents a numerical value corresponding the predetermined type of characteristic being an image capture parameter associated with the image capturing apparatus that captured the image.

10. The apparatus according to claim 9, wherein the numeric value represents a quality of the captured image with respect to the characteristic data.

11. The apparatus according to claim 10, wherein the numeric value represents at least one of a sharpness, a noise amount, a tilt amount and a distortion amount of the captured image.

12. A non-transitory storage medium storing instructions that, when executed by at least one processor, configures an image processing apparatus to:
 obtain an image captured by an image capturing apparatus;
 determine characteristic data of the captured image based on inputting the obtained image into an image analysis model trained with images including a predetermined type of characteristic data;
 identify, based on the determination performed by the image analysis model, metadata including a numeric value regarding the predetermined type of the captured image;
 update the captured image with the identified metadata in a first format when the identified metadata represents a numerical value corresponding to the predetermined type of characteristic data being an image quality feature; and
 update the captured image with the identified metadata in a second format, different from the first format when the identified metadata represents a numerical value corresponding the predetermined type of characteristic being an image capture parameter associated with the image capturing apparatus that captured the image.

13. An image processing method comprising:
obtaining an image from an image capturing device;
identifying first metadata characterizing content of an previously stored image determined to be similar to the captured image using information describing the previously stored image that was assigned by a user
identifying second metadata characterizing content of the previously stored image determined to be similar to the captured image using information describing the previously stored image that was designated automatically;
controlling a display to display an item which is determined based on the first and second metadata to be representative of content of the captured image, wherein if a first piece of metadata having a highest confidence among a plurality of pieces of metadata belonging to the first metadata and a second piece of metadata having a highest confidence among a plurality of pieces of metadata belonging to the second metadata is same, the same piece of metadata is determined as at least a piece of the metadata of the captured image.

14. The method according to claim 13, wherein the display item is determined based on the first metadata, second metadata and confidence information of each of the first and second metadata.

15. The method according to claim 14, wherein the first metadata is biased more than the second metadata to determine the content of the captured image.

16. The method according to claim 13, wherein if the first metadata is same as the second metadata, the same metadata is determined as metadata for the captured image, and wherein the display item corresponding to the metadata for the captured image is displayed.

17. The method according to claim 13, wherein if the first metadata is not same as the second metadata, metadata for the captured image is determined as the metadata, among the first and second metadata, associated with confidence information having a higher confidence.

18. The method according to claim 13, wherein the second metadata is data added by using a model trained by machine learning to the similar image.

19. The method according to claim 13, wherein the first and second metadata indicate information regarding an object included in the captured image.

20. The method according to claim 13, wherein the first and second metadata have data indicating the same content.

21. An image processing apparatus comprising:
a memory storing instructions; and
at least one processor, that upon execution of the instructions, is configured to:
   obtain an image from an image capturing device;
   identify first metadata characterizing content of an previously stored image determined to be similar to the captured image using information describing the previously stored image that was assigned by a user
   identify second metadata characterizing content of the previously stored image determined to be similar to the captured image using information describing the previously stored image that was designated automatically;
   control a display to display an item which is determined based on the first and second metadata to be representative of content of the captured image, wherein if a first piece of metadata having a highest confidence among a plurality of pieces of metadata belonging to the first metadata and a second piece of metadata having a highest confidence among a plurality of pieces of metadata belonging to the second metadata is same, the same piece of metadata is determined as at least a piece of the metadata of the captured image.

22. The method according to claim 21, wherein the display item is determined based on the first metadata, second metadata and confidence information of each of the first and second metadata.

23. The method according to claim 21, wherein if the first metadata is same as the second metadata, the same metadata is determined as metadata for the captured image, and wherein the display item corresponding to the metadata for the captured image is displayed.

24. The method according to claim 21, wherein if the first metadata is not same as the second metadata, metadata for the captured image is determined as the metadata, among the first and second metadata, associated with confidence information having a higher confidence.

25. A non-transitory storage medium storing instructions that, when executed by at least one processor, configures an image processing apparatus to:
   obtain an image from an image capturing device;
   identify first metadata characterizing content of an previously stored image determined to be similar to the captured image using information describing the previously stored image that was assigned by a user
   identify second metadata characterizing content of the previously stored image determined to be similar to the captured image using information describing the previously stored image that was designated automatically;
   control a display to display an item which is determined based on the first and second metadata to be representative of content of the captured image, wherein if a first piece of metadata having a highest confidence among a plurality of pieces of metadata belonging to the first metadata and a second piece of metadata having a highest confidence among a plurality of pieces of metadata belonging to the second metadata is same, the same piece of metadata is determined as at least a piece of the metadata of the captured image.

* * * * *